(12) United States Patent
Euzen et al.

(10) Patent No.: US 7,270,738 B2
(45) Date of Patent: Sep. 18, 2007

(54) CATALYST AND PROCESS FOR HYDROCRACKING HYDROCARBON-CONTAINING FEEDSTOCKS

(75) Inventors: Patrick Euzen, Paris (FR); Carole Bobin, Marly le Roi (FR); Magalie Roy-Auberger, Bourgoin Jallieu (FR); Eric Benazzi, Chatou (FR); Patrick Bourges, Nanterre (FR); Christophe Gueret, St. Romain en Gal (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 474 days.

(21) Appl. No.: 10/696,561

(22) Filed: Oct. 30, 2003

(65) Prior Publication Data
US 2004/0138059 A1 Jul. 15, 2004

(30) Foreign Application Priority Data
Oct. 30, 2002 (FR) .................................. 02 13640

(51) Int. Cl.
*C01G 47/00* (2006.01)
*C01G 45/00* (2006.01)
*C01G 17/00* (2006.01)
*B01J 23/00* (2006.01)
*B01J 21/00* (2006.01)

(52) U.S. Cl. .............................. 208/111.3; 208/111.01; 208/111.35; 208/89; 502/254; 502/255; 502/256; 502/257; 502/258; 502/259; 502/260; 502/261; 502/262; 502/263; 502/305; 502/313; 502/314; 502/315; 502/316; 502/319; 502/320; 502/321; 502/322; 502/323; 502/326; 502/327; 502/332; 502/333; 502/334; 502/335; 502/336; 502/337; 502/338; 502/339; 502/407; 502/415; 502/439

(58) Field of Classification Search ........ 502/254–263, 502/305, 313–316, 319–323, 326, 327, 332–339, 502/407, 415, 439; 208/111.01, 111.3, 111.35, 208/89
See application file for complete search history.

(56) References Cited

U.S. PATENT DOCUMENTS

| | | | |
|---|---|---|---|
| 3,471,399 A | 10/1969 | O'Hara | |
| 3,925,197 A | 12/1975 | Dautzenberg | |
| 4,051,021 A | 9/1977 | Hamner | |
| 4,134,856 A | 1/1979 | Itoh et al. | |
| 4,416,804 A * | 11/1983 | Antos et al. | 502/213 |
| 4,837,193 A | 6/1989 | Kumagai et al. | |
| 5,827,421 A * | 10/1998 | Sherwood, Jr. | 208/112 |
| 5,928,499 A * | 7/1999 | Sherwood et al. | 208/216 PP |
| 5,968,344 A | 10/1999 | Bellussi et al. | |
| 5,968,348 A * | 10/1999 | Sherwood, Jr. | 208/216 PP |
| 6,045,689 A * | 4/2000 | Alario et al. | 208/139 |
| 6,136,179 A * | 10/2000 | Sherwood et al. | 208/109 |
| 6,218,334 B1 * | 4/2001 | Alario et al. | 502/226 |
| 6,231,750 B1 | 5/2001 | Kumagai et al. | |
| 6,284,210 B1 * | 9/2001 | Euzen et al. | 423/213.5 |
| 6,515,035 B2 * | 2/2003 | Roy-Auberger et al. | 518/715 |
| 6,573,214 B2 * | 6/2003 | Abdo et al. | 502/332 |
| 6,576,588 B2 * | 6/2003 | Ryu et al. | 502/331 |
| 6,673,742 B2 * | 1/2004 | Abdo et al. | 502/332 |
| 6,733,657 B2 * | 5/2004 | Benazzi et al. | 208/110 |
| 6,908,878 B2 * | 6/2005 | Euzen et al. | 502/241 |

FOREIGN PATENT DOCUMENTS

| | | | |
|---|---|---|---|
| FR | 2780309 A | 12/1999 | |
| WO | WO9819791 A | 5/1998 | |

* cited by examiner

*Primary Examiner*—Cam N. Nguyen
(74) *Attorney, Agent, or Firm*—Millen, White, Zelano & Branigan, P.C.

(57) ABSTRACT

This invention relates to silico-aluminum substrates, catalysts, and the hydrocracking and hydrotreatment processes that use them. The catalyst comprises at least one hydro-dehydrogenating element that is selected from the group that is formed by elements of group VIB and group VIII of the periodic table and a non-zeolitic silica-alumina-based substrate that contains an amount of more than 5% by weight and less than or equal to 95% by weight of silica ($SiO_2$) and has the following characteristics:

A mean pore diameter, measured by mercury porosimetry, encompassed between 20 and 140 Å, a total pore volume, measured by mercury porosimetry, encompassed between 0.1 ml/g and 0.6 ml/g, a total pore volume, measured by nitrogen porosimetry, encompassed between 0.1 ml/g and 0.6 ml/g, a BET specific surface area encompassed between 100 and 550 m²/g, a pore volume, measured by mercury porosimetry, encompassed in the pores with diameters of more than 140 Å, of less than 0.1 ml/g, a pore volume, measured by mercury porosimetry, encompassed in the pores with diameters of more than 160 Å, of less than 0.1 ml/g, a pore volume, measured by mercury porosimetry, encompassed in the pores with diameters of more than 200 Å, of less than 0.1 ml/g, a pore volume, measured by mercury porosimetry, encompassed in the pores with diameters of more than 500 Å, of less than 0.01 ml/g, an X diffraction diagram contains at least the main lines that are characteristic of at least one of the transition aluminas contained in the group that consists of the alpha, rho, chi, eta, gamma, kappa, theta and delta aluminas.

37 Claims, No Drawings

CATALYST AND PROCESS FOR HYDROCRACKING HYDROCARBON-CONTAINING FEEDSTOCKS

This invention relates to the silico-aluminum substrates, catalysts, and the hydrocracking processes that use them.

The objective of the process is essentially the production of middle distillates, i.e., fractions with initial boiling points of at least 150° C. and final boiling points that go just up to the initial boiling point of the residue, for example less than 340° C., or else 370° C.

PRIOR ART

The hydrocracking of heavy petroleum fractions is a very important refining process that makes it possible to produce, starting from excess heavy feedstocks that cannot be readily upgraded, lighter fractions such as gasolines, jet fuels and light gas oils that the refiner seeks to adapt his production to the structure of the demand. Certain hydrocracking processes make it possible also to obtain a strongly purified residue that can provide excellent bases for oils. Relative to the catalytic cracking, the advantage of the catalytic hydrocracking is to provide middle distillates, jet fuels and gas oils of very good quality. Conversely, the gasoline that is produced has a much lower octane rating than the one that is obtained from catalytic cracking.

Hydrocracking is a process that draws its flexibility from three main elements that are the operating conditions that are used, the types of catalysts that are used, and the fact that the hydrocracking of hydrocarbon-containing feedstocks can be carried out in one or two stages.

The hydrocracking catalysts that are used in the hydrocracking processes are all of the bifunctional type combining an acid function with a hydrogenating function. The acid function is provided by substrates whose surface areas generally vary from 150 to 800 $m^2 \cdot g^{-1}$ and that exhibit a surface acidity, such as the halogenated aluminas (chlorinated or fluorinated in particular), combinations of boron and aluminum oxides, amorphous silica-aluminas and zeolites. The hydrogenating function is provided either by one or by several metals of group VIII of the periodic table, or by a combination of at least one metal of group VIB of the periodic table and at least one metal of group VIII.

The equilibrium between the two acid and hydrogenating functions is one of the parameters that control the activity and the selectivity of the catalyst. A weak acid function and a strong hydrogenating function provide catalysts that are not very active, working at, in general, a high temperature (greater than or equal to 390-400° C.) and at a low feed volumetric flow rate (the VVH that is expressed by volume of feedstock to be treated per unit of volume of catalyst and per hour is generally less than or equal to 2), but endowed with a very good selectivity of middle distillates. Conversely, a strong acid function and a weak hydrogenating function provide catalysts that are active but that have poorer selectivities of middle distillates (jet fuels and gas oils).

A type of conventional hydrocracking catalysts is based on moderately acidic amorphous substrates, such as silica-aluminas for example. These systems are used to produce good quality middle distillates and optionally oil bases. These catalysts are used, for example, in the two-stage processes.

The performance levels of these catalysts are closely tied to their physico-chemical characteristics and more particularly to their textural characteristics. Thus in a general way, the presence of macropores in the catalysts that comprise a silica-alumina (such as those that are described in, for example, U.S. Pat. No. 5,370,788) is a drawback. Macropores are defined as pores whose diameters are greater than 500 Å.

Wanting to resolve this problem, the applicant decided to prepare hydrocracking catalysts with reduced contents of macropores and that exhibit improved catalytic performance levels in the hydrocracking processes.

More specifically, the invention relates to a hydrocracking catalyst, the substrate that is used for preparing said catalyst and the hydroracking process that uses it.

DETAILED DESCRIPTION OF THE INVENTION

Characterization Techniques

In the following presentation of the invention, specific surface area is defined as the B.E.T. specific surface area that is determined by nitrogen adsorption according to ASTM Standard D 3663-78 established from the BRUNAUER-EMMETT-TELLER method that is described in the periodical "The Journal of American Society," 60, 309, (1938).

In the following presentation of the invention, mercury volume of the substrates and catalysts is defined as the volume that is measured by mercury porosimeter intrusion according to the ASTM Standard D4284-83 at a maximum pressure of 4000 bar, using a surface tension of 484 dyne/cm and a contact angle for the amorphous silica-alumina substrates of 140°. The mean mercury diameter is defined as being a diameter such that all of the pores of a size less than this diameter constitute 50% of pore volume ($V_{Hg}$) in an interval encompassed between 36 Å and 1000 Å. One of the reasons for which it is preferable to use the substrate as a base to define the pore distribution resides in the fact that the contact angle of the mercury varies after impregnation of metals based on the nature and the type of metals. The wetting angle was assumed to be equal to 140° by following the recommendations of the work "Techniques de l'ingénieur, traité analyse et caractérisation [Engineering Techniques, Analytical Treatise and Characterization]," P 1050-5, written by Jean Charpin and Bernard Rasneur.

To obtain a better precision, the value of the mercury volume in ml/g that is provided in the text below corresponds to the value of the total mercury volume in ml/g measured in the sample minus the value of the mercury volume in ml/g that is measured in the same sample for a pressure corresponding to 30 psi (about 2 bar). The mean mercury diameter is also defined as being a diameter such that all of the pores of a size less than this diameter constitute 50% of the total mercury pore volume.

Finally, to better characterize the pore distribution, the following pore distribution criteria in terms of mercury are defined: volume V1 corresponds to the volume that is contained in the pores whose diameter is less than the mean diameter minus 30 Å. Volume V2 corresponds to the volume that is contained in the pores with diameters that are greater than or equal to the mean diameter minus 30 Å and less than the mean diameter plus 30 Å. Volume V3 corresponds to the volume that is contained in the pores with diameters that are more than or equal to the mean diameter plus 30 Å. Volume V4 corresponds to the volume that is contained in the pores whose diameters are less than the mean diameter minus 15 Å. Volume V5 corresponds to the volume that is contained in the pores with diameters that are greater than or equal to the mean diameter minus 15 Å and less than the mean diameter plus 15 Å. Volume V6 corresponds to the volume that is contained in the pores with diameters that are greater than or equal to the mean diameter plus 15 Å.

The pore distribution that is measured by nitrogen adsorption was determined by the Barrett-Joyner-Halenda (BJH) model. The nitrogen adsorption-desorption isotherm according to the BJH model is described in the periodical "The Journal of American Society," 73, 373, (1951) written by E. P. Barrett, L. G. Joyner and P. P. Halenda. In the following presentation of the invention, nitrogen adsorption volume is defined as the measured volume for $P/P_o=0.99$, pressure for which it is assumed that nitrogen filled all the pores. The mean nitrogen desorption diameter is defined as being a diameter such that all of the pores that are smaller than this diameter constitute 50% of the pore volume (Vp) measured on the desorption branch of the nitrogen isotherm.

Adsorption surface area means the surface area that is measured on the branch of the adsorption isotherm. Reference will be made to, for example, the article by A. Lecloux "Mémoires Société Royale des Sciences de Liège, 6$^{ème}$ série [6$^{th}$ Series], Tome I [Volume 1], fasc. 4 [Section 4], pp. 169-209 (1971)."

The sodium content was measured by atomic absorption spectrometry.

X diffraction is a technique that can be used to characterize the substrates and catalysts according to the invention. In the following presentation, the analysis of x rays is carried out on powder with a Philips PW 1830 diffractometer that operates in reflection and is equipped with a rear monochromator by using CoKalpha radiation ($\lambda K_{\alpha 1}=1.7890$ Å, $\lambda 1 K_{\alpha 2}=1.793$ Å, intensity ratio $K_{\alpha 1}/K_{\alpha 2}=0.5$). For the X diffraction diagram of the gamma-alumina, reference will be made to the ICDD data base, form 10-0425. In particular, the two most intense peaks are located at a position that corresponds to one d encompassed between 1.39 and 1.40 Å and one d encompassed between 1.97 Å and 2.00 Å. d is called the interreticular distance that is derived from the angular position by using Bragg's equation ($2d_{(hkl)}* \sin(\theta)=\eta*\lambda$). Gamma-alumina is defined in the text below, i.a., as, for example, an alumina contained in the group that consists of cubic gamma-aluminas, pseudo-cubic gamma-aluminas, tetragonal gamma-aluminas, poorly or slightly crystallized gamma-aluminas, large-surface gamma-aluminas, low-surface gamma-aluminas, gamma-aluminas that are obtained from coarse boehmite, gamma-aluminas that are obtained from crystallized boehmite, gamma-aluminas that are obtained from boehmite that is slightly or poorly crystallized, gamma-aluminas that are obtained from a mixture of crystallized boehmite and an amorphous gel, gamma-aluminas that are obtained from an amorphous gel, and gamma-aluminas evolving toward delta. For the positions of diffraction peaks of eta, delta and theta aluminas, it is possible to refer to the article by B. C. Lippens and J. J. Steggerda in Physical and Chemical Aspects of Adsorbents and Catalysts, E. G. Linsen (Ed.), Academic Press, London. 1970, pp. 171-211.

For the substrates and catalysts according to the invention, the X diffraction diagram demonstrates a wide peak that is characteristic of the presence of amorphous silica.

Furthermore, in the entire text that follows, the alumina compound can contain an amorphous fraction that is difficult to detect by the DRX techniques. It will therefore be understood below that the alumina compounds that are used or described in the text can contain an amorphous or poorly crystallized fraction.

The substrates and catalysts according to the invention have been analyzed by NMR MAS of the solid of $^{27}$Al on a spectrometer of the Brüker Company such as MSL 400, with a 4 mm probe. The speed of rotation of the samples is on the order of 11 kHz. Potentially, the NMR of the aluminum makes it possible to distinguish three types of aluminum whose chemical displacements are presented below:

Between 100 and 40 ppm, tetra-coordinated-type aluminum, denoted as $Al_{IV}$,

Between 40 and 20 ppm, penta-coordinated-type aluminum, denoted as $Al_V$,

Between 20 and −100 ppm, hexa-coordinated-type aluminum, denoted as $Al_{VI}$.

The aluminum atom is a quadripolar core. Under certain analysis conditions (weak radiofrequency fields: 30 kHz, low-impulse angle: $\pi/2$ and water-saturated sample), the NMR technique of magic angle rotation (MAS) is a quantitative technique. The decomposition of the NMR MAS spectra makes it possible to gain access directly to the amount of different radicals. The spectrum is locked in chemical displacement relative to a 1 M solution of aluminum nitrate. The aluminum signal is at zero ppm. We chose to integrate the signals between 100 and 20 ppm for the $Al_{IV}$ and $Al_V$, which corresponds to area 1, and between 20 and −100 ppm for $Al_{VI}$, which corresponds to area 2. In the following presentation of the invention, proportion of octahedral $Al_{VI}$ is defined as the following ratio: area 2/(area 1+area 2).

A method for characterization of the substrates and catalysts according to the invention that can be used is transmission electronic microscopy (MET). For this purpose, an electronic microscope (such as Jeol 2010 or Philips Tecna120F, optionally with scanning) that is equipped with an energy dispersion spectrometer (EDS) for x-ray analysis (for example a Tracor or an Edax) is used. The EDS detector should make possible the detection of light elements. The combination of these two tools, MET and EDS, makes it possible to combine the imagery and the local chemical analysis with a good spatial resolution.

For this type of analysis, the samples are finely ground in the dry state in a mortar; the powder is then included in the resin to produce ultrafine fractions with a thickness of about 70 nm. These fractions are collected on Cu grids that are covered by an amorphous carbon film with holes used as a substrate. They are then introduced into the microscope for observation and analysis under secondary vacuum. By imagery, the sample zones are then easily distinguished from the resin zones. A certain number of analyses, 10 at a minimum, preferably between 15 and 30, are then initiated on different zones of the industrial sample. The size of the electronic beam for the analysis of the zones (approximately determining the size of the analyzed zones) is 50 nm of diameter at a maximum, preferably 20 nm, even more preferably 10, 5, 2 or 1 nm of diameter. In the scanned mode, the analyzed zone will be based on the size of the scanned zone and no longer on the size of the beam, which is generally reduced.

The semi-quantitative treatment of X spectra collected with the help of the EDS spectrometer makes it possible to obtain the relative concentration of A and Si (in % atomic) and the Si/Al ratio for each of the analyzed zones. It is then possible to calculate the $Si/Al_m$ mean and the standard deviation $\sigma$ of this set of measurements.

In the non-limiting examples of the following presentation of the invention, the 50 nm probe is the probe that is used to characterize the substrates and catalysts according to the invention, unless otherwise indicated.

The packing density (DRT) is measured in the manner that is described in the work "Applied Heterogeneous Catalysis" by J. F. Le Page, J. Cosyns, P. Courty, E. Freund, J.-P. Franck, Y. Jacquin, B. Juguin, C. Marcilly, G. Martino, J. Miguel, R. Montarnal, A. Sugier, H. Van Landeghem, Technip. Paris, 1987. A graduated cylinder with acceptable dimensions is filled with catalyst by successive additions; and between each addition, the catalyst is packed by shaking the cylinder until a constant volume is achieved. This measurement is generally carried out on 1000 cm$^3$ of catalyst that is packed into a cylinder whose height to diameter ratio is close to 5:1. This measurement can preferably be made on automated devices such as Autotap® that is marketed by Quantachrome®.

The acidity of the matrix is measured by infra-red (IR) spectrometry. The IR spectra are recorded on a Nicolet interferometer such as Nexus-670 under a resolution of 4 cm$^{-1}$ with a Happ-Genzel-type apodization. The sample (20 mg) is pressed in the form of a self-supported pellet, then is placed in an in-situ analysis cell (25° C. to 550° C., furnace offset from the IR beam, secondary vacuum of 10$^{-6}$ mbar). The diameter of the pellet is 16 mm.

The sample is pretreated in the following way to eliminate the physisorbed water and to dehydroxylate partially the surface of the catalyst to obtain a representative image of the acidity of the catalyst in use:
  increase in temperature from 25° C. to 300° C. in 3 hours
  plateau of 10 hours at 300° C.
  drop in temperature from 300° C. to 25° C. in 3 hours.

The basic probe (pyridine) is then adsorbed with saturating pressure at 25° C. and then thermo-desorbed according to the following plateaus:
  25° C. for 2 hours under secondary vacuum
  100° C. for 1 hour under secondary vacuum
  200° C. for 1 hour under secondary vacuum
  300° C. for 1 hour under secondary vacuum.

A spectrum is recorded at 25° C. at the end of the pretreatment and at each desorption plateau in transmission mode with an accumulation time of 100 s. The spectra are set to iso-mass (therefore assumed to be at iso-thickness) (20 mg exactly). The number of Lewis sites is proportional to the surface area of the peak whose maximum lies around 1450 cm$^{-1}$, including any shoulder. The number of Bronsted sites is proportional to the surface area of the peak whose maximum is located toward 1545 cm$^{-1}$. The ratio of the number of Bronsted sites/number of Lewis sites (B/L) is estimated to be equal to the ratio of the surface areas of two peaks described above. The surface area of peaks at 25° C. is generally used. This B/L ratio is generally calculated from the spectrum that is recorded at 25° C. at the end of the pretreatment.

More specifically, the invention relates to a catalyst that comprises at least one hydro-dehydrogenating element that is selected from the group that is formed by the elements of group VIB and group VIII of the periodic table and a non-zeolitic silica-alumina-based substrate that contains an amount of more than 5% by weight and less than or equal to 95% by weight of silica ($SiO_2$), whereby said catalyst exhibits the following characteristics:
  a mean pore diameter, measured by mercury porosimetry, encompassed between 20 and 140 Å,
  a total pore volume, measured by mercury porosimetry, encompassed between 0.1 ml/g and 0.6 ml/g,
  a total pore volume, measured by nitrogen porosimetry, encompassed between 0.1 ml/g and 0.6 ml/g,
  a BET specific surface area encompassed between 100 and 550 m$^2$/g,
  a pore volume, measured by mercury porosimetry, encompassed in the pores with diameters of more than 140 Å, of less than 0.1 ml/g,
  a pore volume, measured by mercury porosimetry, encompassed in the pores with diameters of more than 160 Å, of less than 0.1 ml/g,
  a pore volume, measured by mercury porosimetry, encompassed in the pores with diameters of more than 200 Å, of less than 0.1 ml/g,
  a pore volume, measured by mercury porosimetry, encompassed in the pores with diameters of more than 500 Å, of less than 0.01 ml/g,
  an X diffraction diagram that contains at least the main lines that are characteristic of at least one of the transition aluminas encompassed in the group that consists of the alpha, rho, chi, eta, gamma, kappa, theta and delta aluminas.

The packing density of the catalysts is generally more than 0.85 g/cm$^3$, preferably more than 0.95 g/cm$^3$, very preferably more than 1.025 cm$^3$/g and even more preferably more than 1.1 g/cm$^3$.

More specifically, the invention relates to a non-zeolitic silica-alumina-based substrate that contains an amount that is more than 5% by weight and less than or equal to 95% by weight of silica ($SiO_2$), characterized by:
  a mean pore diameter, measured by mercury porosimetry, encompassed between 20 and 140 Å,
  a total pore volume, measured by mercury porosimetry, encompassed between 0.1 ml/g and 0.6 ml/g,
  a total pore volume, measured by nitrogen porosimetry, encompassed between 0.1 ml/g and 0.6 ml/g,
  a BET specific surface area encompassed between 100 and 550 m$^2$/g,
  a pore volume, measured by mercury porosimetry, encompassed in the pores with diameters of more than 140 Å, of less than 0.1 ml/g,
  a pore volume, measured by mercury porosimetry, encompassed in the pores with diameters of more than 160 Å, of less than 0.1 ml/g,
  a pore volume, measured by mercury porosimetry, encompassed in the pores with diameters of more than 200 Å, of less than 0.1 ml/g,
  a pore volume, measured by mercury porosimetry, encompassed in the pores with diameters of more than 500 Å, of less than 0.01 ml/g,
  an X diffraction diagram that contains at least the main lines that are characteristic of at least one of the transition aluminas contained in the group that consists of the rho, chi, eta, gamma, kappa, theta and delta aluminas.

The packing density of the substrates, after calcination, is generally more than 0.65 g/cm$^3$, preferably more than 0.72 g/cm$^3$, very preferably more than 0.75 g/cm$^3$ and even more preferably more than 0.78 g/cm$^3$.

A catalyst that contains the preceding substrate is also encompassed in the invention.

This invention also relates to a process for hydrocracking and/or hydroconversion, and a process for hydrotreatment of hydrocarbon-containing feedstocks with said catalysts.

The invention relates to a hydrocracking catalyst that comprises:
  a non-zeolitic silica-alumina-based substrate (i.e., that comprises silica and alumina) with a content by mass of silica ($SiO_2$) that is greater than 5% by weight and less than or equal to 95% by weight, preferably between 10 and 80% by weight, preferably a silica content that is greater than 20% by weight and less than 80% by weight and even more preferably greater than 25% by weight and less than 75% by weight, and the silica content is advantageously encompassed between 10 and 50% by weight, preferably a cationic impurity content of less than 0.1% by weight, preferably less than 0.05% by weight, and even more preferably less then 0.025% by weight. Cationic impurity content is defined as the total alkaline content.

preferably an anionic impurity content of less than 1% by weight, preferably less than 0.5% by weight and even more preferably less than 0.1% by weight.

The silica-alumina that is used in the process according to the invention is preferably a silica-alumina that is homogeneous on the micrometer scale and in which the cationic impurity content (for example $Na^+$) is less than 0.1% by weight, preferably less than 0.05% by weight, and even more preferably less than 0.025% by weight, and the anionic impurity content (for example $SO_4^{2-}$, $Cl^-$) is less than 1% by weight, preferably less than 0.5% by weight, and even more preferably less than 0.1% by weight.

Thus, any silica-alumina synthesis process that is known to one skilled in the art that leads to a silica-alumina that is homogeneous on the micrometer scale and in which the cationic impurities (for example, $Na^+$) can be set at less than 0.1%, preferably at a content that is less than 0.05% by weight, and even more preferably at a content that is less than 0.025% by weight and in which the anionic impurities (for example $SO_4^{2-}$, $Cl^-$) can be set at less than 1% and more preferably at a content that is less than 0.05% by weight, is suitable for preparing the substrates that are the object of the invention:

- at least one hydro-dehydrogenating element that is selected from the group that is formed by the elements of group VIB and group VIII of the periodic table,
- preferably a content by mass of metal(s) of group VIB, in metallic form or in oxide form, encompassed between 1 and 50% by weight, preferably between 1.5 and 35%, and even more preferably between 1.5 and 30%,
- preferably a content by mass of metals of group VIII, in metallic form or in oxide form, encompassed between 0.1 and 30% by weight, preferably between 0.2 and 25% and even more preferably between 0.2 and 20%,
- optionally at least one dopant that is deposited on a catalyst and selected from the group that is formed by phosphorus, boron and silicon. The contents by mass of boron, silicon, and phosphorus in the form of oxides are between 0.1 and 15%, preferably between 0.1 and 10% and even more advantageously between 0.1 and 5% by weight. Dopant is defined as an element that is introduced after the preparation of the silico-aluminum substrate that is described above,
- optionally at least one element of group VIIB (manganese, for example, and preferably) and a content by weight encompassed between 0 and 20%, preferably between 0 and 10% of the compound in oxide or metal form,
- optionally at least one element of group VB (niobium, for example and preferably), and a content by weight encompassed between 0 and 40%, preferably between 0 and 20% of the compound in oxide or metal form,
- a mean pore diameter, measured by mercury porosimetry, encompassed between 20 and 140 Å, preferably between 40 and 120 Å, and even more preferably between 50 and 100 Å,
- preferably a ratio between volume V2, measured by mercury porosimetry, encompassed between $D_{mean}-30$ Å and $D_{mean}+30$ Å, to the total pore volume that is also measured by mercury porosimetry that is more than 0.6, preferably more than 0.7, and even more preferably more than 0.8,
- preferably a volume V3 that is encompassed in the pores with diameters of greater than $D_{mean}+30$ Å, measured by mercury porosimetry, that is less than 0.1 ml/g, preferably less than 0.06 ml/g, and even more preferably less than 0.04 ml/g,
- preferably a ratio between volume V5 that is encompassed between $D_{mean}-15$ Å and $D_{mean}+15$ Å, measured by mercury porosimetry, and volume V2 that is encompassed between $D_{mean}-30$ Å and $D_{mean}+30$ Å, measured by mercury porosimetry, that is more than 0.6, preferably more than 0.7, and even more preferably more than 0.8,
- preferably a volume V6 that is encompassed in the pores with diameters that are greater than $D_{mean}+15$ Å, measured by mercury porosimetry, that is less than 0.2 ml/g, preferably less than 0.1 ml/g, and even more preferably less than 0.05 ml/g,
- a total pore volume, measured by mercury porosimetry, encompassed between 0.1 ml/g and 0.6 ml/g, preferably encompassed between 0.20 and 0.50 ml/g, and even more preferably more than 0.20 ml/g,
- a total pore volume, measured by nitrogen porosimetry, encompassed between 0.1 ml/g and 0.6 ml/g, preferably between 0.20 and 0.50 ml/g,
- a BET specific surface area encompassed between 100 and 550 m²/g, preferably encompassed between 150 and 500 m²/g,
- preferably an adsorption surface area such that the ratio between the adsorption surface area and the BET surface area is more than 0.5, preferably more than 0.65, and more preferably more than 0.8,
- a pore volume, measured by mercury porosimetry, encompassed in the pores with diameters of more than 140 Å, of less than 0.1 ml/g, preferably of less than 0.05 ml/g, and even more preferably of less than 0.03 ml/g,
- a pore volume, measured by mercury porosimetry, encompassed in the pores with diameters of more than 160 Å, of less than 0.1 ml/g, preferably of less than 0.05 ml/g, and even more preferably of less than 0.025 ml/g,
- a pore volume, measured by mercury porosimetry, encompassed in the pores with diameters of more than 200 Å, of less than 0.1 ml/g, preferably of less than 0.05 ml/g, and even more preferably of less than 0.025 ml/g,
- a pore volume, measured by mercury porosimetry, encompassed in the pores with diameters of more than 500 Å, of less than 0.01 ml/g,
- an X diffraction diagram that contains at least the main lines that are characteristic of at least one of the transition aluminas contained in the group that consists of the rho, chi, kappa, eta, gamma, theta and delta aluminas, and preferably characterized in that it contains at least the main lines that are characteristic of at least one of the transition aluminas contained in the group that consists of the gamma, eta, theta and delta alumina, and more preferably, characterized in that it contains at least the main lines that are characteristic of the gamma-alumina and eta-alumina, and even more preferably characterized in that it contains the peaks at one d encompassed between 1.39 and 1.40 Å and the peaks at one d encompassed between 1.97 Å and 2.00 Å.

The NMR MAS spectra of the solid of $^{27}Al$ of the substrates and catalysts show two clusters of separate peaks.

A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 110 ppm. This cluster can be decomposed into at least two radicals. The predominant radical of this cluster would correspond to $Al_{IV}$ atoms (tetrahedral). For the substrates and catalysts of this invention, advantageously the proportion of octahedral $Al_{VI}$ is more than 50%, preferably more than 60%, and even more preferably more than 70%.

In an embodiment of the invention, the catalyst contains a substrate that comprises at least two silico-aluminum zones, whereby said zones have Si/Al ratios that are less than or greater than the overall Si/Al ratio that is determined by X fluorescence. Thus, a substrate that has an Si/Al ratio that is equal to 0.5 comprises, for example, two silico-aluminum zones, one of the zones has an Si/Al ratio that is determined by MET of less than 0.5, and the other zone has an Si/Al ratio that is determined by MET encompassed between 0.5 and 2.5.

In another embodiment of the invention, the catalyst contains a substrate that comprises a single silico-aluminum zone, whereby said zone has an Si/Al ratio that is equal to the overall Si/Al ratio that is determined by X fluorescence and is less than 2.3.

The acidity of the substrate according to the invention can advantageously be measured, without restricting the scope of the invention, by IR tracking of the thermodesorption of the pyridine. Generally, the B/L ratio, as described above, of the substrate according to the invention is between 0.05 and 1, preferably between 0.05 and 0.7, very preferably between 0.06 and 0.3, and even more preferably between 0.075 and 0.15.

Preparation Processes

The catalysts according to the invention can be prepared according to all of the methods that are well known to one skilled in the art.

A preferred process for preparation of the catalyst according to this invention comprises the following stages:

According to a preferred preparation method, the precursor is obtained by direct shaping of the silica-alumina alone or by shaping the silica-alumina with at least one binder, then drying and calcination. The elements of groups VIB and/or VIII, and optionally those that are selected from among phosphorus, boron, silicon and optionally the elements of groups VB and VIIB, are then optionally introduced by any method that is known to one skilled in the art, before or after the shaping and before or after the calcination of the precursor or the catalyst.

The hydrogenating element can be introduced at any stage of the preparation, preferably during the mixing, or very preferably after shaping. The shaping is followed by a calcination; the hydrogenating element can also be introduced before or after this calcination. The preparation generally ends by a calcination at a temperature of 250 to 600° C. Another of the preferred methods according to this invention consists in shaping the silica-alumina without a binder after the latter is mixed, then passage of the thus obtained paste through a die to form extrudates with a diameter encompassed between 0.4 and 4 mm. The hydrogenating function can then be introduced in part only (the case, for example, of combinations of metal oxides from groups VIB and VIII) or completely, at the time of mixing. It can also be introduced by one or more ion exchange operations on the calcined substrate that consists of at least one silica-alumina, optionally shaped with a binder, with the aid of solutions that contain precursor salts of the metals that are selected when the latter belong to group VIII. It can also be introduced by one or more operations for impregnation of the shaped and calcined substrate, by a solution of the precursors of the metal oxides of group VIII (in particular cobalt and nickel) when the precursors of metal oxides of group VIB (in particular molybdenum and tungsten) were previously introduced at the time of mixing of the substrate. It can also be introduced, finally, in a very preferred way, by one or more operations for impregnation of the calcined substrate that consists of at least one silica-alumina according to the invention and optionally at least one binder, by solutions that contain the precursors of the metal oxides of groups VI and/or VIII, whereby the precursors of the metal oxides of group VIII are preferably introduced after those of group VIB or at the same time as the latter.

The substrate is preferably impregnated by an aqueous solution. The impregnation of the substrate is preferably carried out by the so-called "dry" impregnation method that is well known to one skilled in the art. The impregnation can be carried out in a single stage by a solution that contains all of the elements that constitute the final catalyst.

The catalyst of this invention can therefore contain at least one element of group VIII, such as iron, cobalt, nickel, ruthenium, rhodium, palladium, osmium, iridium or platinum. Among the metals of group VIII, it is preferred to use a metal that is selected from the group that is formed by iron, cobalt, nickel, platinum, palladium and ruthenium. The catalyst according to the invention can also contain at least one element of group VIB, preferably tungsten and molybdenum. The following combinations of metals are advantageously used: nickel-molybdenum, cobalt-molybdenum, iron-molybdenum, iron-tungsten, nickel-tungsten, cobalt-tungsten, platinum-palladium, and the preferred combinations are: nickel-molybdenum, cobalt-molybdenum, cobalt-tungsten, and even more advantageously platinum-palladium and nickel-tungsten. It is also possible to use combinations of three metals, for example nickel-cobalt-molybdenum and nickel-cobalt-tungsten. The following combinations of metals are advantageously used: nickel-niobium-molybdenum, cobalt-niobium-molybdenum, iron-niobium-molybdenum, nickel-niobium-tungsten, cobalt-niobium-tungsten, and iron-niobium-tungsten, whereby the preferred combinations are: nickel-niobium-molybdenum and cobalt-niobium-molybdenum. It is also possible to use combinations of four metals, for example, nickel-cobalt-niobium-molybdenum. It is also possible to use combinations that contain a noble metal, such as ruthenium-niobium-molybdenum, or else ruthenium-nickel-niobium-molybdenum.

The following elements: boron and/or silicon and/or phosphorus and optionally the element(s) selected from the group(s) VIIB and VB can be introduced into the catalyst at any level of the preparation and according to any technique that is known to one skilled in the art.

A preferred method according to the invention consists in depositing the dopant or dopants selected, for example the boron-silicon pair, on the precursor that may or may not be calcined, preferably calcined. For this purpose, an aqueous solution of at least one boron salt, such as ammonium biborate or ammonium pentaborate in an alkaline medium and in the presence of hydrogen peroxide is prepared, and a so-called dry impregnation in which the volume of the pores of the precursor is filled by the solution that contains, for example, boron, is initiated. In the case where, for example, silicon is also deposited, for example a solution of a silicone-type silicon compound or a silicone-oil emulsion will be used.

The deposition of boron and silicon can also be carried out simultaneously by using, for example, a solution that contains a boron salt and a silicone-type silicon compound. Thus, for example, in the case where the precursor is a nickel-tungsten-type catalyst that is supported on silica-alumina, it is possible to impregnate this precursor by the aqueous solution of ammonium biborate and Rhodorsil E1P silicone of the Rhodia Company to initiate drying at, for example, 120° C., then to impregnate by an ammonium fluoride solution, to initiate drying at, for example, 120° C., and to initiate calcination, for example, and preferably in air in a flushed bed, for example at 500° C. for 4 hours.

The dopant that is selected in the group that is formed by silicon, boron and phosphorus as well as the elements of groups VIIB and VB can be introduced by one or more impregnation operations with excess solution on the calcined precursor.

When optionally at least one dopant, B and/or P and/or Si, is introduced, its distribution and its location can be determined by techniques such as the Castaing microprobe (distribution profile of various elements), transmission electron microscopy, combined with an X analysis of the components of the catalysts, or else by combining distribution mapping of elements that are present in the catalyst by electronic microprobe. These techniques make it possible to demonstrate the presence of these exogenic elements that are added after the synthesis of the silica-alumina according to the invention.

The boron source can be boric acid, preferably orthoboric acid $H_3BO_3$, ammonium biborate or ammonium pentaborate, boron oxide, or boric esters. The boron can be introduced, for example, in the form of a mixture of boric acid, hydrogen peroxide, and a basic organic compound that contains nitrogen, such as ammonia, primary and secondary amines, cyclic amines, compounds of the pyridine family and quinolines, and compounds of the pyrrole family. Boron can be introduced, for example, by a boric acid solution in a water/alcohol mixture.

The preferred phosphorus source is orthophosphoric acid $H_3PO_4$, but its salts and esters, such as the ammonium phosphates, are also suitable. Phosphorus can be introduced, for example, in the form of a phosphoric acid mixture and a basic organic compound that contains nitrogen, such as ammonia, primary and secondary amines, cyclic amines, compounds of the pyridine family and quinolines, and compounds of the pyrrole family.

Many silicon sources can be used. Thus, it is possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added by, for example, impregnation of ethyl silicate in solution in a water/alcohol mixture. The silicon can be added, for example, by impregnation of a silicone-type silicon compound or silicic acid that is suspended in water.

The metals of group VIB and of group VIII of the catalyst of this invention can be completely or partially present in metallic form and/or oxide form and/or sulfide form.

For example, among the sources of molybdenum and tungsten, it is possible to use oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, and silicotungstic acid and their salts.

The sources of elements of group VIII that can be used are well known to one skilled in the art. For example, for non-noble metals, nitrates, sulfates, hydroxides, phosphates, halides, for example chlorides, bromides and fluorides, and carboxylates, for example acetates and carbonates, will be used. For noble metals, halides, for example chlorides, nitrates, acids such as chloroplatinic acid, and oxychlorides, such as ammoniacal ruthenium oxychloride, will be used.

Preferably, halogens other than the one introduced in the impregnation will not be added, whereby this halogen is preferably chlorine.

Characteristics of the Substrate

The catalyst that is thus obtained is prepared, by any technique known to one skilled in the art, starting from a substrate whose characteristics are as follows:

- the content by mass of silica ($SiO_2$) is more than 5% by weight and less than or equal to 95% by weight of silica ($SiO_2$), preferably encompassed between 10 and 80% by weight, preferably a silica content of more than 20% by weight and less than 80% by weight and even more preferably more than 25% by weight and less than 75% by weight, and the silica content is advantageously between 10 and 50% by weight,
- preferably the cationic impurity content is less than 0.1% by weight, preferably less than 0.05% by weight, and even more preferably less than 0.025% by weight. Cationic impurity content is defined as the total alkaline content.
- preferably the anionic impurity content is less than 1% by weight, preferably less than 0.5% by weight, and even more preferably less than 0.1% by weight,
- the mean pore diameter, measured by mercury porosimetry, is encompassed between 20 and 140 Å, preferably between 40 and 120 Å, and even more preferably between 50 and 100 Å,
- preferably the ratio between volume V2, measured by mercury porosimetry, encompassed between $D_{mean}-30$ Å and $D_{mean}+30$ Å to the total pore volume that is also measured by mercury porosimetry, is more than 0.6, more preferably more than 0.7, and even more preferably more than 0.8,
- preferably volume V3 encompassed in the pores with diameters of more than $D_{mean}+30$ Å, measured by mercury porosimetry, is less than 0.1 ml/g, preferably less than 0.06 ml/g, and even more preferably less than 0.04 ml/g,
- preferably the ratio between volume V5, measured by mercury porosimetry, encompassed between $D_{mean}-15$ Å and $D_{mean}+15$ Å to volume V2, measured by mercury porosimetry, encompassed between $D_{mean}-30$ Å and $D_{mean}+30$ Å, is more than 0.6, more preferably more than 0.7, and even more preferably more than 0.8,
- preferably volume V6, encompassed in the pores with diameters of more than $D_{mean}+15$ Å and measured by mercury porosimetry, is less than 0.2 ml/g, preferably less than 0.1 ml/g and even more preferably less than 0.05 ml/g,
- the total pore volume, measured by mercury porosimetry, is encompassed between 0.1 ml/g and 0.6 ml/g, preferably encompassed between 0.20 et 0.50 ml/g and even more preferably more than 0.20 ml/g,
- the total pore volume, measured by nitrogen adsorption, is encompassed between 0.1 ml/g and 0.6 ml/g, preferably encompassed between 0.20 and 0.50 ml/g, the BET specific surface area is encompassed between 100 and 550 m²/g, preferably encompassed between 150 and 500 m²/g, preferably the adsorption surface area is such that the ratio between the adsorption surface area and the BET surface area is more than 0.5, more preferably more than 0.65, and even more preferably more than 0.8, the pore volume, measured by mercury porosimetry, encompassed in the pores with diameters of more than 140 Å, is less than 0.1 ml/g, preferably less than 0.05 ml/g, and even more preferably less than 0.03 ml/g, the pore volume, measured by mercury porosimetry, encompassed in the pores with diameters of more than 160 Å, is less than 0.1 ml/g, preferably less than 0.05 ml/g, and even more preferably less than 0.025 ml/g, the pore volume, measured by mercury porosimetry, encompassed in the pores with diameters of more than 200 Å, is less than 0.1 ml/g, preferably less than 0.05 ml/g, and even more preferably less than 0.025 ml/g, the pore volume, measured by mercury porosimetry, encompassed in the pores with diameters of more than 500 Å, is less than 0.01 ml/g, the X diffraction diagram contains at least the main lines that are characteristic of at least one of the transition aluminas contained in the group that consists of the alpha, rho, chi, kappa, eta, gamma, theta and delta aluminas, preferably characterized in that it contains at least the main lines that are characteristic of at least one of the transition aluminas that is contained in the group that consists of the gamma-, eta-, theta- and delta-alumina, more preferably characterized in that it contains at least the main lines that are characteristic of the gamma- and eta-alumina and even more preferably characterized in that it contains peaks at one d encompassed between 1.39 and 1.40 Å and at one d encompassed between 1.97 Å and 2.00 Å.

The NMR MAS spectra of the solid of $^{27}$Al of the substrates show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 110 ppm. This cluster can be decomposed into at least two radicals. The predominant radical of this cluster would correspond to $Al_{IV}$ atoms (tetrahedral). For the substrates and catalysts of this invention, advantageously the proportion of octahedral $Al_{VI}$ is more than 50%, preferably more than 60%, and even more preferably more than 70%.

In an embodiment of the invention, the catalyst contains at least two silico-aluminum zones that have Si/Al ratios that are less than or greater than the overall Si/Al ratio that is determined by X fluorescence. A substrate according to this invention that has an overall Si/Al ratio that is equal to 0.5 comprises, for example, two silico-aluminum zones, one of the zones has an Si/Al ratio that is determined by MET of less than 0.5, and the other zone has an Si/Al ratio that is determined by MET of between 0.5 and 2.5.

In another embodiment of the invention, the substrate comprises a single silico-aluminum zone that has an Si/Al ratio that is equal to the overall Si/Al ratio that is determined by X fluorescence and is less than 2.3.

The acidity of the substrate according to the invention can advantageously be measured, without restricting the scope of the invention, by IR tracking of the thermodesorption of the pyridine. Generally, the B/L ratio, as described above, of the substrate according to the invention is between 0.05 and 1, preferably between 0.05 and 0.7, very preferably between 0.06 and 0.3, and even more preferably between 0.075 and 0.15.

Preparation of the Substrate

The applicant discovered that the silico-aluminum substrates, obtained starting from a mixture at any arbitrary stage of an alumina compound that is partially soluble in acid medium shaped with a totally soluble silica compound or with a totally soluble combination of hydrated alumina and silica, followed by a hydrothermal or thermal treatment so as to homogenize on the micrometer scale, and even on the nanometer scale, would make it possible to obtain a particularly active catalyst in the hydrocracking processes. Partially soluble in acid medium is defined as bringing the alumina compound into contact before any addition of totally soluble silica compound or the combination with an acid solution, for example, nitric acid or sulfuric acid, causes partial dissolution thereof.

Silica Sources

The silica compounds that are used according to the invention may have been selected from the group that is formed by silicic acid, silicic acid soils, water-soluble alkaline silicates, cationic silicon salts, for example the hydrated sodium metasilicate, Ludox® in ammonia form or in alkaline form, and quaternary ammonium silicates. The silica soil can be prepared according to one of the methods known to one skilled in the art. A decationized orthosilicic acid solution is preferably prepared starting from a water-soluble alkaline silicate by ion exchange on a resin.

Totally Soluble Silica-Alumina Sources

The totally soluble hydrated silica-aluminas that are used according to the invention can be prepared by true coprecipitation under controlled stationary operating conditions (pH, concentration, temperature, average dwell time) by reaction of a basic solution that contains silicon, for example in the form of sodium silicate, optionally aluminum, for example, in sodium aluminate form with an acid solution that contains at least one aluminum salt, for example aluminum sulfate. At least one carbonate or else $CO_2$ optionally can be added to the reaction medium.

The applicant defines true coprecipitation as a process by which at least one aluminum compound that is totally soluble in basic medium or acid medium as described below, and at least one silicon compound as described below are brought into contact, simultaneously or sequentially, in the presence of at least one precipitating and/or coprecipitating compound so as to obtain a mixed phase that essentially consists of hydrated silica-alumina that is optionally homogenized by intense stirring, shearing, colloidal milling or else by a combination of these unitary operations. For example, these hydrated silica-aluminas may have been prepared according to the teachings of U.S. Pat. Nos. 2,908,635, 3,423,332, 3,433,747, 3,451,947, 3,629,152, and 3,650,988.

The total dissolution of the silica compound or the combination was evaluated approximately according to the following method. A fixed amount (15 g) of the silica compound or the hydrated combination is introduced into a preset pH medium. The concentration of solid added per liter of suspension is preferably 0.2 mol per liter. The pH of the dispersion solution is at least 12, and it can be obtained by use of an alkaline source. It is preferably advantageous to use NaOH. The mixture is then stirred mechanically by a deflocculant-type turbine stirring mechanism for 30 minutes at 800 rpm. Once the stirring is ended, the mixture is centrifuged for 10 minutes at 3000 rpm. The cake is separated from the supernatant liquid. The solution was filtered on a filter with a porosity of 4 and a diameter of 19 cm. The drying and then the calcination are then initiated at 1000° C. of the two fractions. Then, an equal ratio R is defined by dividing the decanted mass by the mass of the solid in suspension. Totally soluble is defined as a ratio R that is at least higher than 0.9.

Alumina Sources

The alumina compounds that are used according to the invention are partially soluble in acid medium. They are selected completely or partially from the group of alumina compounds of general formula $Al_2O_3$, $nH_2O$. It is possible in particular to use hydrated alumina compounds such as: hydrargillite, gibbsite, bayerite, boehmite, pseudo-boehmite, and amorphous or essentially amorphous alumina gels. It is also possible to use the dehydrated forms of these compounds that consist of transition aluminas and that comprise at least one of the phases that is included in the group: rho, chi, eta, gamma, kappa, theta, and delta, which differ essentially by the organization of their crystalline structure. The alpha-alumina that is commonly called corundum can be incorporated in a small proportion in the substrate according to the invention.

This partial dissolution property is a desired property of the invention; it applies to hydrated alumina powders, to sprayed hydrated alumina powders, to dispersions or suspensions of hydrated alumina or to any combination thereof, before any addition of a compound that contains some or all of the silicon.

The partial dissolution of the alumina compound was evaluated approximately according to the following method. A specific amount of the alumina compound in powdered or suspension form is introduced into a preset pH medium. The mixture is then stirred mechanically. Once the stirring is ended, the mixture is left without stirring for 24 hours. Preferably, the $Al_2O_3$ solid concentration that is added per liter of suspension is 0.5 mol per liter. The pH of the dispersion solution is 2 and is obtained by use of either $HNO_3$, or HCl, or $HClO_4$. Preferably, it is advantageous to use $HNO_3$. The distribution of sedimented and dissolved fractions was followed by metering of aluminum by UV absorption. The supernatants were ultrafiltered (polyether sulfone membrane, Millipore NMWL: 30,000) and digested in concentrated acid. The amount of aluminum in the supernatant corresponds to the non-sedimented alumina compound and the dissolved aluminum and the fraction that is ultrafiltered with dissolved aluminum only. The amount of sedimented particles is derived from the theoretical concentration of aluminum in the dispersion (by considering that all of the solid that is introduced is dispersed) and amounts of boehmite actually dispersed and aluminum in solution.

The alumina precursors that are used according to this invention are therefore distinguished from those that are used in the case of true co-precipitations that are entirely soluble in acid medium: cationic alumina salts, for example aluminum nitrate. The methods that are part of the invention are distinguished from true co-precipitations because one of the elements, in this case the aluminum compound, is partially soluble.

To use the alumina, any alumina compound of general formula $Al_2O_3$, $nH_2O$ can be used. Its specific surface area is between 150 and 600 $m^2/g$. It is possible in particular to use hydrated alumina compounds, such as: hydrargillite, gibbsite, bayerite, boehmite, pseudo-boehmite and amorphous or essentially amorphous alumina gels. It is also possible to use the dehydrated forms of these compounds that consist of transition aluminas and that comprise at least one of the phases that is included in the group: rho, chi, eta, gamma, kappa, theta, delta and alpha, which differ essentially by the organization of their crystalline structure. During heat treatments, these different forms are liable to evolve among themselves, according to a complex relationship that depends on the treatment operating conditions. It is also possible to use the alpha-alumina that is commonly called corundum in measured proportions.

Aluminum hydrate $Al_2O_3$, $nH_2O$ that is used more preferably is boehmite, pseudo-boehmite and the amorphous or essentially amorphous alumina gels. A mixture of these products under any arbitrary combination can also be used.

Boehmite is generally described as an aluminum monhydrate of formula $Al_2O_3$, $nH_2O$ that in reality includes a broad continuum of materials with variable degrees of hydration and organization with more or less well-defined boundaries: the most hydrated gelatinous boehmite, with n able to be more than 2, the pseudo-boehmite or the microcrystalline boehmite with n encompassed between 1 and 2, then crystalline boehmite, and finally boehmite that is well crystallized with large crystals with n close to 1. The morphology of aluminum monohydrate can vary within broad limits between these two acicular or prismatic end forms. An entire set of variable forms can be used between these two forms: chain, boats, interlaced platelets.

The preparation and/or the shaping of the aluminum hydrate thus can constitute the first stage of the preparation of these catalysts. Many patents relate to the preparation and/or the shaping of transition-alumina-based substrates that are obtained from aluminum monohydrate: U.S. Pat. Nos. 3,520,654; 3,630,670; 3,864,461; 4,154,812; 4,313,923; DE 3243193; and U.S. Pat. No. 4,371,513.

Relatively pure aluminum hydrates can be used in the form of amorphous or crystallized powder or crystallized powder containing an amorphous portion. The aluminum hydrate can also be introduced in the form of aqueous suspensions or dispersions. The aqueous suspensions or dispersions of aluminum hydrate that are used according to the invention may have the ability to gel or solidify. The aqueous dispersions or suspensions can also be obtained, as is well known to one skilled in the art, by peptization in water or water that is acidified with aluminum hydrates.

The dispersion of aluminum hydrate can be carried out by any process that is known to one skilled in the art: in a batch reactor, a continuous mixer, a mixing machine, or a colloidal mill. Such mixing can be also be carried out in a piston flow reactor and, in particular, in a static mixer. The Lightnin reactors can be cited.

In addition, it is also possible to use as an alumina source an alumina that has been subjected in advance to a treatment that can improve its degree of dispersion. By way of example, it will be possible to improve the dispersion of the alumina source by a preliminary homogenization treatment. For homogenization, it is possible to use at least one of the homogenization treatments described in the following text.

The aqueous dispersions or suspensions of alumina that can be used are, in particular, the aqueous suspensions or dispersions of fine or ultra-fine boehmites that consist of particles that have dimensions in the colloidal range.

Fine or ultra-fine boehmites that are used according to this invention may have been obtained in particular according to French Patents FR-1 261 182 and FR-1 381 282 or in European Patent Application EP 15 196.

It is also possible to use the aqueous suspensions or dispersions that are obtained from pseudo-boehmite, amorphous alumina gels, aluminum hydroxide gels or ultra-fine hydrargillite gels.

Aluminum monohydrate can be purchased from among a variety of commercial sources of alumina, such as, in particular, PURAL®, CATAPAL®, DISPERAL®, and DISPAL® that are marketed by the SASOL Company or else HIQ® that is marketed by ALCOA, or according to the methods that are known to one skilled in the art: it can be prepared by partial dehydration of aluminum trihydrate by conventional methods or it can be prepared by precipitation. When these alumina are presented in the form of a gel, they are peptized by water or an acidified solution. In the precipitation, the acid source can be selected, for example, from among at least one of the following compounds: aluminum chloride, aluminum sulfate, or aluminum nitrate. The basic aluminum source can be selected from among the basic aluminum salts such as sodium aluminate and potassium aluminate.

As precipitating agents, sodium hydroxide, sodium carbonate, potassium and ammonia can be used. The precipitating agents are selected such that the alumina source according to this invention and these agents are precipitated together.

According to the acidic or basic nature of the aluminum-based starting compound, the aluminum hydrate is precipitated with the help of a base or an acid that is selected, for example, from among hydrochloric acid, sulfuric acid, soda or a basic or acidic compound of the aluminum as cited above. The two reagents can be aluminum sulfate and sodium aluminate. For an example of preparation of aluminum alpha-monohydrate that uses aluminum sulfate and sodium aluminate, it is possible to refer in particular to U.S. Pat. No. 4,154,812.

In particular, pseudo-boehmite may have been prepared according to the process that is described in U.S. Pat. No. 3,630,670 by reaction of an alkaline aluminate solution with a mineral acid solution. The pseudo-boehmite may have been prepared in particular according to the process that is described in U.S. Pat. No. 3,630,670 by reaction of an alkaline aluminate solution with a solution of a mineral acid. It may also have been prepared as described in French Patent FR 1 357 830.

In particular, the amorphous alumina gels may have been prepared according to the processes that are described in the article "Alcoa Paper No. 19 (1972) pages 9 to 12" and in particular by reaction of acid aluminate or an aluminum salt or by hydrolysis of aluminum alcoholates or by hydrolysis of basic aluminum salts.

The aluminum hydroxide gels can be in particular those that have been prepared according to the processes that are described in U.S. Pat. Nos. 3,268,295 and 3,245,919.

In particular, the aluminum hydroxide gels may be those that are prepared according to the processes that are described in Patent WO 00/01617, by mixing an aluminum acid source and a base or an aluminum basic source and an acid so as to precipitate an alumina monohydrate, whereby the following stages are:

2. development
3. filtration
4. washing, and
5. drying, processes that are characterized in that the mixing of stage one is carried out without retromixing.

The ultrafine hydrargillite may have been prepared in particular according to the process that is described in U.S. Pat. No. 1,371,808 by evolving toward a temperature encompassed between ambient temperature and 60° C. of alumina gels in cake form and that contain 0.1 monovalent acid ions relative to the alumina, counted in $Al_2O_3$ molecules.

It is also possible to use ultra-pure aqueous suspensions or dispersions of boehmite or pseudo-boehmite that are prepared according to a process in which the reaction of an alkaline aluminate with the carbonic anhydride is carried out to form an amorphous aluminum hydroxycarbonate precipitate, the precipitate that is obtained by filtration is separated, and then the latter is washed (the process is described in particular in U.S. Pat. No. 3,268,295).

Then,
a) in a first stage, the precipitate that is washed with amorphous aluminum hydroxycarbonate is mixed with an acid solution, a base or a salt or mixtures thereof; this mixing is carried out by pouring the solution over the hydroxycarbonate, whereby the pH of the thus constituted medium is less than 11,
b) in a second stage, the thus constituted reaction medium is heated to a temperature of less than 90° C. for a period of at least 5 minutes,
c) in a third stage, the medium that results from the second stage is heated to a temperature of between 90° C. et 250° C.

The boehmite and pseudo-boehmite dispersions or suspensions that are obtained according to this process exhibit an alkaline content of less than 0.005% that is expressed in the form of a ratio by weight of alkaline metal oxide/$Al_2O_3$.

When it is desired to produce very pure catalyst substrates, ultra-pure boehmite or pseudo-boehmite suspensions or dispersions are preferably used that have been obtained according to the process that was described above, or the aluminum hydroxide gels that were prepared starting from the hydrolysis of aluminum alcoholates according to a process of the type that is described in U.S. Pat. No. 2,892,858.

In summary, the production process that leads to such boehmite-type aluminum hydroxide gels obtained as a by-product in the production of alcohol by hydrolysis of an alcoholate or alkoxide of aluminum (Ziegler synthesis) is described. The Ziegler alcohol synthesis reactions are described in particular in U.S. Pat. No. 2,892,858. According to this process, first triethyl aluminum is prepared starting from aluminum, hydrogen and ethylene, whereby the reaction is carried out in two stages with partial recycling of triethyl aluminum.

Ethylene is added into the polymerization stage, and the product that is obtained is then oxidized into aluminum alcoholate, whereby the alcohols are obtained by hydrolysis.

The aluminum hydroxide gels can also be those that were prepared according to the processes described in U.S. Pat. No. 4,676,928-A and U.S. Pat. No. 6,030,599.

The hydrated alumina that is obtained as a by-product of the Ziegler reaction is described in particular in a report of the CONOCO Company dated Jan. 19, 1971.

The dimension of the alumina particles that constitute the alumina source can vary within wide limits. It is generally between 1 and 100 microns.

Methods

The substrate can be advantageously prepared by one of the methods described below.

By way of example, a method of preparation of a silica-alumina that is part of the invention consists in preparing, starting from a water-soluble alkaline silicate, an orthosilicic acid solution ($H_2SiO_4$, $H_2O$) that is decationized by ion exchange, then in simultaneously adding it to a cationic aluminum salt in solution, for example, nitrate, and to ammonia under controlled operating conditions; or else adding the orthosilicic acid solution to the cationic aluminum salt in solution and coprecipitating the solution that is obtained by ammonia under controlled operating conditions leading to a homogeneous product. This silica-alumina hydrogel is mixed with an aluminum hydrate powder or suspension. After filtering and washing, drying with shaping then calcination, preferably in air, in a rotary kiln, at a high temperature and for an adequate period to promote interactions between the alumina and the silica, generally at least two hours, a substrate that fulfills the characteristics of the invention is obtained.

Another method for preparation of silica-alumina according to the invention consists in precipitating the alumina hydrate as above, in washing it, then in mixing it with aqueous orthosilicic acid so as to obtain a suspension, which is thoroughly homogenized by vigorous stirring and shearing. An Ultraturrax turbine or else a Staro turbine can be used, or else a colloidal mill, for example a Staro colloidal mill. The homogeneous suspension is then dried by spraying as above, then calcined between 500 and 1200° C. for at least three hours: a silica-alumina substrate that can be used in the process according to the invention is obtained.

Another method that is part of the invention consists in preparing as above a decationized solution of orthosilicic acid then in adding it simultaneously or consecutively to an alumina compound, for example an aluminum hydrate in powdered form or in an acidified suspension form. To increase the diameter of the pores of the final silica-alumina substrate, at least one basic compound can optionally be added to the reaction medium. After an intense homogenization of the suspension by stirring, optional adjustment by filtration of the content of dry material then optionally rehomogenization, the product is dried with simultaneous or consecutive shaping, then is calcined as above.

Another method that is also part of the invention consists in preparing an aqueous alumina suspension or dispersion, for example an aluminum monohydrate, then in adding it simultaneously or consecutively to a silica compound, for example a sodium silicate. To increase the final diameter of the pores of the silica-alumina substrate, at least one basic compound can optionally be added to the reaction medium. The substrate is obtained by filtration and washing, optionally washing by an ammonia solution to extract the residual sodium by ion exchange, and drying with simultaneous or consecutive shaping. After drying with shaping, then calcination as above, a substrate that fulfills the characteristics of the invention is obtained. The size of the alumina particles used is preferably between 1 and 100 microns to obtain a good homogenization of the silica-alumina substrate according to the invention.

To increase the diameter of the mesopores of the silica-alumina substrate, it may be particularly advantageous, as U.S. Pat. No. 4,066,574 teaches us, to prepare an aqueous alumina suspension or dispersion, for example, an aluminum monohydrate, and then to neutralize by a basic solution, for example ammonia, then to add it simultaneously or consecutively to a silica compound, for example a decationized orthosilicic acid solution. After an intensive homogenization of the suspension by intense stirring, optional adjustment by filtration of the dry material content then rehomogenization, the product is dried with simultaneous or consecutive shaping, then is calcined as above. This method is also part of the methods that are used according to the invention.

In the presentation of the above-mentioned methods, homogenization is used to describe putting back into solution a product that contains a solid fraction, for example a suspension, a powder, a filtered precipitate, then its dispersion under intense stirring. The homogenization of a dispersion is a process that is well known to one skilled in the art. Said homogenization can be carried out by any process that is known to one skilled in the art: by way of example, in a batch reactor, a continuous mixer, or a mixing machine. Such a mixing can be carried out in a piston flow reactor and in particular in a static reactor. The Lightnin reactors can be cited. An Ultraturrax® turbine or else a Staro® turbine can be used, or else a colloidal mill, for example a Staro colloidal mill. The commercial colloidal mills IKA® can also be used.

In all of the above-mentioned methods, it may optionally be desirable to add, during any arbitrary stage of the preparation, a minor proportion of at least one stabilizing element that is selected from the group that is formed by zirconia and titanium. The stabilizing element is preferably added in the form of a soluble salt.

Shaping of Substrates and Catalysts

The substrate can be obtained by shaping the silica-alumina by any technique that is known to one skilled in the art. The shaping can be carried out, for example, by extrusion, by pelletizing, by the drop (oil-drop) coagulation method, by turntable granulation or by any other method that is well known to one skilled in the art.

The shaping can also be carried out in the presence of various components of the catalyst and extrusion of the mineral paste that is obtained, by pelletizing, shaping in the form of balls with a rotating groove or with a drum, drop coagulation, oil-drop, oil-up or any other known process for agglomeration of a powder that contains alumina and optionally other ingredients that are selected from among those that are mentioned above.

The catalysts that are used according to the invention have the shape of spheres or extrudates. It is advantageous, however, that the catalyst comes in the form of extrudates with diameters of between 0.5 and 5 mm and more particularly between 0.7 and 2.5 mm. The shapes are cylindrical (which may or may not be hollow), twisted cylindrical, multilobar (2, 3, 4 or 5 lobes, for example), and rings. The cylindrical shape is preferably used, but any other shape may be used.

Furthermore, these substrates that are used according to this invention may have been treated, as is well known to one skilled in the art, by additives to facilitate the shaping and/or to improve the final mechanical properties of the silico-aluminum substrates. By way of example of additives, it is possible to cite in particular cellulose, carboxymethyl-cellulose, carboxy-ethyl-cellulose, tall oil, xanthan gums, surfactants, flocculant agents such as polyacrylamides, carbon black, starches, stearic acid, polyacrylic alcohol, polyvinyl alcohol, biopolymers, glucose, polyethylene glycols, etc.

The adjustment of the porosity that is characteristic of the substrates of the invention is carried out partially during this shaping stage of the substrate particles.

The shaping can be carried out by using techniques for shaping the catalysts, known to one skilled in the art, such as, for example: extrusion, sugar-coating, spray-drying or else pelletizing.

It is possible to add or to remove water to adjust the viscosity of the paste that is to be extruded. This stage can be carried out at any point of the mixing stage.

To adjust the content of solid material of the paste that is to be extruded so as to make it extrudable, it is also possible to add a compound that is solid for the most part and preferably an oxide or a hydrate. A hydrate will preferably be used, and even more preferably, an aluminum hydrate will be used. The fire loss of this hydrate will be more than 15%.

The acid content added in the mixing before the shaping is less than 30%, preferably between 0.5 and 20% by weight of the anhydrous silica and alumina mass that is engaged in the synthesis.

The extrusion can be carried out by any conventional tool, available commercially. The paste that is obtained from mixing is extruded through a dye, for example with the help of a piston or a single- or double-extrusion screw. This extrusion stage can be carried out by any method that is known to one skilled in the art.

The substrate extrudates according to the invention generally have a resistance to crushing of at least 70 N/cm and preferably greater than or equal to 100 N/cm.

Calcination of the Substrate

The drying is carried out by any technique that is known to one skilled in the art.

To obtain the substrate of this invention, it is preferable to calcinate preferably in the presence of molecular oxygen, for example by carrying out a flushing with air, at a temperature that is less than or equal to 1100° C. At least one calcination can be carried out after any arbitrary stage of the preparation. This treatment can be performed, for example, in a flushed bed, in a swept bed or in static atmosphere. For example, the furnace that is used can be a rotary kiln or a vertical furnace with radial flushed layers. The calcination conditions: the temperature and duration depend mainly on the maximum temperature of use of the catalyst. The preferred conditions of calcination are between more than one hour at 200° C. to less than one hour at 1100° C. The calcination can be performed in the presence of water vapor. The final calcination optionally can be carried out in the presence of an acid or basic vapor. For example, the calcination can be carried out under partial pressure of ammonia.

Post-Synthesis Treatments

Post-synthesis treatments can be carried out so as to improve the properties of the substrate, in particular its homogeneity as defined above.

According to the invention, the substrate thus can optionally be subjected to a hydrothermal treatment in a confined atmosphere. Hydrothermal treatment in a confined atmosphere is defined as a treatment by passage with an autoclave in the presence of water under a temperature that is higher than the ambient temperature.

During this hydrothermal treatment, it is possible to treat the shaped silica-alumina in different ways. Thus, it is possible to impregnate the silica-alumina with acid, prior to its passage to the autoclave, whereby autoclaving of the silica-alumina is done either in vapor phase or in liquid phase, whereby this vapor phase or liquid phase of the autoclave may or may not be acid. This impregnation, prior to the autoclaving, may or may not be acid. This impregnation, prior to the autoclaving, can be carried out in the dry state or by immersion of the silica-alumina in an acidic aqueous solution. Dry impregnation is defined as bringing into contact the alumina with a solution volume that is less than or equal to the total pore volume of the treated alumina. The impregnation is preferably carried out in the dry state.

The autoclave is preferably a rotary-basket autoclave such as the one that is defined in Patent Application EP-A-0 387 109.

The temperature during the autoclaving can be between 100 and 250° C. for a period of time of between 30 minutes and 3 hours.

Hydrocracking Processes

The invention also relates to hydrocracking processes that use hydrocracking catalysts according to the invention, whereby said processes cover pressure and conversion ranges that go from soft hydrocracking to high-pressure hydrocracking. Soft hydrocracking is defined as hydrocracking that leads to moderate conversions, generally less than 40%, and that operate at low pressure, generally between 2 MPa and 6 MPa. In general, the catalysts according to the invention are used for the treatment of hydrocarbon-containing fractions. The catalysts according to the invention are advantageously used for hydrocracking and/or hydroconversion of hydrocarbon-containing fractions.

The catalyst of this invention can be used alone in one or more fixed catalyst beds, in one or more reactors, in a so-called single-stage hydrocracking arrangement, with or without liquid recycling of the unconverted fraction, optionally in combination with a hydrorefining catalyst that is located upstream from the catalyst of this invention.

The catalyst of this invention can be used alone, in one or more reactors in a boiling bed, in a so-called single-stage hydrocracking arrangement, with or without liquid recycling of the unconverted fraction, optionally in combination with a hydrorefining catalyst that is located in a fixed-bed reactor or a boiling-bed reaction upstream from the catalyst of this invention.

The boiling bed is operated with removal of spent catalyst and daily addition of new catalyst so as to preserve an activity of stable catalyst.

In a so-called two-stage hydrocracking arrangement with intermediate separation between the two reaction zones, in a given stage, the catalyst of this invention can be used in one or in the two reactors that may or may not be combined with a hydrorefining catalyst that is located upstream from the catalyst of this invention.

So-Called Single-Stage Process

The so-called single-stage hydrocracking in the first place and in general comprises an intensive hydrorefining whose purpose is to carry out intensive hydrodenitrating and desulfurization of the feedstock before the latter is sent to the actual hydrocracking catalyst itself, in particular in the case where the latter comprises a zeolite. This intensive hydrorefining of the feedstock produces only a limited conversion of the feedstock, in lighter fractions, which remains inadequate and therefore is to be completed on the more active hydrocracking catalyst. It should be noted, however, that no separation occurs between the two types of catalysts. The entire effluent at the reactor outlet is injected in the actual hydrocracking catalyst itself, and it is only then that separation of the products that are formed takes place. This hydrocracking version, again called "once through," has a variant that exhibits a recycling of the unconverted fraction toward the reactor for the purpose of a more

Embodiment: So-Called Single-Stage Fixed-Bed Process

For the catalysts with a low silica content, the contents by weight of silica of the substrate that enters the composition of the catalyst are encompassed between 5 and 30% and preferably between 5 and 20%.

For the catalysts with a high silica content, the contents by weight of silica of the substrate that enters the composition of the catalyst are encompassed between 20 and 80% and preferably between 30 and 60%.

In the case where the catalyst according to this invention is used upstream from a zeolitic hydrocracking catalyst, for example based on the Y zeolite, a catalyst that has a low content by weight of silica as defined above will advantageously be used. It can also be advantageously used in combination with a hydrorefining catalyst, whereby the latter is located upstream from the catalyst of this invention.

When the catalyst according to this invention is used upstream from a hydrocracking catalyst that is based on silica-alumina or zeolite, in the same reactor in separate catalytic beds or in separate reactors, the conversion is generally (or preferably) less than 50% by weight and preferably less than 40%.

Embodiment: So-Called Single-Stage Boiling-Bed Process

The catalyst according to the invention can be used alone in one or more reactors.

Within the scope of such a process, several reactors in a series can advantageously be used, whereby the boiling-bed reactor(s) contain(s) the catalyst according to the invention that is preceded by one or more reactors that contain at least one fixed-bed or boiling-bed hydrorefining catalyst.

When the catalyst according to this invention is used downstream from a hydrorefining catalyst, the conversion of the fraction of the feedstock that is created by this hydrorefining catalyst is generally (or preferably) less than 30% by weight and preferably less than 25%.

Embodiment: So-Called Single-Stage Fixed-Bed Process with Hot Flash

The catalyst according to this invention can also be used in a so-called single-stage hydrocracking process that comprises a hydrorefining zone, a zone that allows the partial elimination of ammonia, for example by hot flash, and a zone that comprises a hydrocracking catalyst. This process for hydrocracking hydrocarbon-containing feedstocks in one stage for the production of middle distillates and optionally oil bases comprises at least a first reaction zone that includes a hydrorefining, and at least a second reaction zone, in which the hydrocracking of at least a portion of the effluent of the first reaction zone is carried out. This process also comprises an incomplete separation of ammonia from the effluent that exits from the first zone. This separation is advantageously carried out with an intermediate hot flash. The hyrocracking that is carried out in the second reaction zone is carried out in the presence of ammonia in an amount that is less than the amount that is present in the feedstock, preferably less than 1500 ppm by weight, more preferably less than 1000 ppm by weight and even more preferably less than 800 ppm by weight of nitrogen. The catalyst of this invention is preferably used in the hydrocracking reaction zone that may or may not be combined with a hydrorefining catalyst that is located upstream from the catalyst of this invention.

The catalyst according to the invention can be used either in the first conversion pretreatment reaction zone, alone, or combined with a standard hydrorefining catalyst, located upstream from the catalyst according to the invention, in one or more catalytic beds, in one or more reactors.

Embodiment: So-Called Single-Stage Hydrocracking Process with Preliminary Hydrorefining on the Low-Acidity Catalyst The catalyst according to the invention can be used in a hydrocracking process that comprises:
 a first hydrorefining reaction zone in which the feedstock is brought into contact with at least one hydrorefining catalyst that exhibits in the standard activity test a conversion rate of the methylcyclohexane that is less than 10% by mass,
 a second hydrocracking reaction zone in which at least a portion of the effluent that is obtained from the hydrorefining stage is brought into contact with at least one non-zeolitic hydrocracking catalyst according to the invention that exhibits in the standard activity test a conversion rate of the methylcyclohexane that is more than 10% by mass.

The proportion of the catalytic volume of the hydrorefining catalyst represents 20 to 45% of the total catalytic volume.

The effluent that is obtained from the first reaction zone is at least partly, preferably completely, introduced into the second reaction zone of said process. An intermediate separation of the gases can be carried out.

The effluent at the outlet of the second reaction zone is subjected to a so-called final separation (for example, by atmospheric distillation optionally followed by a vacuum distillation) so as to separate the gases. At least one residual liquid fraction that essentially contains products whose boiling point is generally more than 340° C. and that can be at least partly recycled upstream from the second reaction zone of the process according to the invention and preferably upstream from the silica-alumina-based hydrocracking catalyst, is obtained in a facility for the production of middle distillates.

The conversion of products that have boiling points of less than 340° C., or else less than 370° C., is at least 50% by weight.

The standard activity test has as its object to measure the activity of catalysts in the conversion of methylcyclohexane under the following operating conditions:

The catalyst is sulfurized in advance under a pressure of 06 bar, at 350° C. by means of a so-called reaction mixture that comprises 0.5% by mass of aniline, 1.5% by mass of dimethyl disulfide, and 98% by mass of methylcyclohexane, for 4 hours. Then always under the same reaction flow by adding hydrogen and under the following operating conditions: pressure of 60 bar, volumetric flow rate VVh of 1 $h^{-1}$, H2/reaction mixture: 1000 Nl of hydrogen/l of liquid reaction mixture (Nl=normal liter) ratio, the temperature is gradually brought to a reaction temperature of 380° C.

Under these operating conditions, a catalyst is considered as exhibiting a low acidity if it leads to a conversion rate of methylcyclohexane that is less than 10% by mass and preferably less than 5%.

The conversion of the methylcyclohexane reagent is defined as the transformation of the latter into isomerization products with 7 carbon atoms, such as, for example, the dimethylcyclopentanes, into ring-opening products and into cracking products. The conversion of methylcyclohexane, as defined, therefore takes into account all of the different products of methylcyclohexane. Obtaining all of these products requires the presence of a more or less strong acid function on the catalyst.

Embodiment: So-Called Two-Stage Process

The two-stage hydrocracking comprises a first stage whose object is, as in the "single-stage" process, to carry out the hydrorefining of the feedstock, but also to reach a conversion of the latter on the order of, in general, 40 to 60%. The effluent that is obtained from the first stage then undergoes a separation (distillation) that is most often called an intermediate separation, whose object is to separate the conversion products from the unconverted fraction. In the second stage of a two-stage hydrocracking process, only the fraction of the unconverted feedstock during the first stage is treated. This separation allows a two-stage hydrocracking process to be more selective in middle distillates (kerosene+diesel) than a single-stage process. Actually, the intermediate separation of conversion products prevents their "overcracking" into naphtha and gas in the second stage on the hydrocracking catalyst. Furthermore, it should be noted that the unconverted fraction of the feedstock that is treated in the second stage in general contains very low contents of $NH_3$ as well as of organic nitrogen-containing compounds, in general less than 20 ppm by weight and even less than 10 ppm by weight.

The same configuration of catalyst beds in a fixed bed or in a boiling bed can be used in the first stage of a so-called two-stage arrangement, whether the catalyst is to be used alone or combined with a standard hydrorefining catalyst.

For the so-called single-stage processes and for the first stage of the two-stage hydrocracking processes, the preferred catalysts according to the invention are the catalysts that are based on non-noble elements of group VIII, even more preferably the catalysts that are based on nickel and tungsten.

The catalysts that are used in the second stage of the two-stage hydrocracking processes are preferably catalysts that are based on noble elements of group VIII, even more preferably the catalysts that are based on platinum and/or palladium.

Very varied feedstocks can be treated by hydrocracking processes according to the invention that are described above and generally they contain at least 20% by volume and often at least 80% by volume of compounds that boil above 340° C.

The feedstock can be, for example, LCO (light cycle oil), atmospheric distillates, vacuum distillates, for example, gas oils that are obtained from direct distillation of crude or conversion units such as the FCC, the coker, or the visbreaking, as well as feedstocks that are obtained from units for extracting aromatic compounds from lubricating oil bases or obtained from solvent dewaxing of lubricating oil bases, or else distillates that are obtained by desulfurization or hydroconversion processes in a fixed bed or in a boiling bed of RAT (atmospheric residues) and/or RSV (vacuum residues) and/or deasphalted oils, or else the feedstock can be a desasphalted oil, or else any mixture of the feedstocks cited above. The list above is not limiting. The paraffins that are obtained from the Fischer-Tropsch process are excluded. In general, the feedstocks have a boiling point T5 that is higher than 340° C., and, better yet, higher than 370° C., i.e., that 95% of the compounds that are present in the feedstock have a boiling point that is higher than 340° C., and, better yet, higher than 370° C.

The nitrogen content of the feedstocks that are treated in the processes according to the invention is usually higher than 500 ppm, preferably between 500 and 5000 ppm by weight, more preferably between 700 and 4000 ppm by weight, and even more preferably between 1000 and 4000 ppm, and the sulfur content is between 0.01 and 5% by weight, more generally between 0.2 and 4%.

The cumulative content of nickel and vanadium of the feedstocks that are treated in the processes according to the invention is preferably less than 1 ppm by weight.

Prior to the injection of the feedstock, the catalysts that are used in the process according to this invention are preferably subjected in advance to a sulfurization treatment that makes it possible to transform, at least in part, metallic radicals into sulfide before they are brought into contact with the feedstock that is to be treated. This treatment of activation by sulfurization is well known to one skilled in the art and can be carried out by any method that is already described in the literature or in situ, i.e., in the reactor, or ex situ.

A standard sulfurization method that is well known to one skilled in the art consists in heating in the presence of hydrogen sulfide (pure or, for example, under a stream of a hydrogen/hydrogen sulfide mixture) to a temperature encompassed between 150 and 800° C., preferably between 250 and 600° C., generally in a flushed-bed reaction zone.

The operating conditions of the hydrocracking, such as temperature, pressure, hydrogen recycling rate, and hourly volumetric flow rate, can be very variable based on the nature of the feedstock, the quality of the desired products and installations used by the refiner. The hydrocracking catalyst is brought into contact, in the presence of hydrogen, with the feedstocks that are described above, at a temperature of more than 200° C., often encompassed between 250 and 480° C., advantageously encompassed between 320 and 450° C., preferably between 330 and 435° C., under a pressure of more than 1 MPa, often encompassed between 2 and 25 MPa, preferably between 3 and 20 MPa, whereby the volumetric flow rate is between 0.1 and 20 $h^{-1}$ and preferably 0.1-6 $h^{-1}$, preferably 0.2-3 $h^{-1}$, and the amount of hydrogen that is introduced is such that the volumetric ratio of liter of hydrogen/liter of hydrocarbon is encompassed between 80 and 5000 l/l and most often between 100 and 2000 l/l.

These operating conditions that are used in the process according to the invention make it possible to reach conversions per pass into products that have boiling points of less than 340° C., and, better, less than 370° C., more than 15%, and even more preferably encompassed between 20 and 95%.

The following examples illustrate this invention without, however, limiting its scope.

EXAMPLE 1

Preparation and Shaping of a Silica-Alumina According to the Invention (SA1)

Silica-alumina SA1 according to the invention is prepared from a completely soluble silica-alumina that is obtained by any technique that is known to one skilled in the art, to which is added a sodium silicate solution. The method of operation is as follows: in a first step, a 30% sulfuric acid solution is added to a sodium silicate solution. The amount of $H_2SO_4$ is defined so as to work with a set neutralization rate. The addition is made within two minutes while being stirred at 600 rpm. The synthesis temperature is 60° C. The aging time was set for 30 minutes. Stirring was maintained at 600 rpm, and the temperature is that of the preceding stage. Then, $Al_2(SO_4)_3$ (500 ml) is added, and the concentration is set by the desired alumina content. The pH is not regulated and is set by the desired alumina content. The addition is made within 10 minutes. Stirring is always set at 600 rpm, and the temperature is the same as that of the preceding stages. Then, ammonia is added. The gel that is obtained is filtered by displacement. Washing is done with water at 60° C., 3 kg of water per kg of solid that is contained in the gel. Then, an exchange with ammonium nitrate $NH_4NO_3$ (138.5 g/l) at 60° C. and 1.5 l per kg of solid that is contained in the gel is carried out. Finally, an additional washing with water at 60° C. is done by displacement, 3 kg of water per kg of solid that is contained in the gel. The gel that is obtained from this stage is mixed with the Pural boehmite powder such that the final composition of the mixed substrate in anhydrous product is, at this point of the synthesis, equal to 50% $Al_2O_3$-50% $SiO_2$. The mixing is done in a Z-arm mixing machine. The extrusion is carried out by passage of the paste through a die that is equipped with orifices with a diameter of 1.4 mm. The extrudates that are thus obtained are dried at 150° C., calcined at 550° C., then calcined at 700° C. in the presence of water vapor.

The characteristics of the substrate are as follows:

The composition of the substrate is 50.12% $Al_2O_3$-49.88% $SiO_2$.

The BET surface area is 254 $m^2/g$.

The total pore volume, measured by nitrogen adsorption, is 0.43 ml/g.

The mean pore diameter, measured by mercury porosimetry, is 65 Å.

The ratio between volume V2, measured by mercury porosimetry, encompassed between $D_{mean}$−30 Å and $D_{mean}$+30 Å to the total mercury volume is 0.91.

Volume V3, measured by mercury porosimetry, encompassed in the pores with diameters of more than $D_{mean}$+30 Å is 0.03 ml/g.

Volume V6, measured by mercury porosimetry, encompassed in the pores with diameters of more than $D_{mean}$+15 Å is 0.047 ml/g.

The ratio between the adsorption surface area and the BET surface area is 0.76.

The pore volume, measured by mercury porosimetry, encompassed in the pores with diameters of more than 140 Å is 0.015 ml/g.

The pore volume, measured by mercury porosimetry, encompassed in the pores with diameters of more than 160 Å is 0.013 ml/g.

The pore volume, measured by mercury porosimetry, encompassed in the pores with diameters of more than 200 Å is 0.011 ml/g.

The pore volume, measured by mercury porosimetry, encompassed in the pores with diameters of more than 500 Å is 0.001 ml/g.

The X diffraction diagram contains the main lines that are characteristic of the gamma alumina, and in particular it contains the peaks at one d encompassed between 1.39 and 1.40 Å and at one d encompassed between 1.97 Å and 2.00 Å.

The B/L ratio of the substrate is 0.12.

The packing density of the catalyst is 1.05 $g/cm^3$.

The atomic sodium content is 310+/−20 ppm. The atomic sulfur content is 1600 ppm.

The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 67%.

The catalyst contains two silico-aluminum zones, whereby said zones have Si/Al ratios that are less than or greater than the overall Si/Al ratio that is determined by X fluorescence. One of the zones has an Si/Al ratio that is determined by MET of 0.7, and the other zone has an Si/Al ratio that is determined by MET of 0.98.

EXAMPLE 2

Preparation of a Silica-Alumina According to the Invention (SA2)

Substrate SA2 is prepared from substrate SA1 in the form of extrudates that are dried and calcined by impregnation of TEOS (tetraethoxysilane) according to the method that is described by B. Beguin, E. Garbowski, M. Primet in "Journal of Catalysis," page 595, Volume 127, 1991. Then, the impregnated extrudates are dried at 120° C. for 15 hours, calcined at 530° C. under a stream of dry air for 2 hours, then calcined at 700° C. in the presence of water vapor.

The sample that is thus obtained is named SA2.

The extrudates that are thus obtained are dried at 150° C., then calcined at 550° C.

The characteristics of substrate SA2 are as follows:

The composition of the substrate is 47.7% $Al_2O_3$-52.3% $SiO_2$.

The BET surface area is 282 $m^2/g$.

The total pore volume, measured by nitrogen adsorption, is 0.41 ml/g.

The mean pore diameter, measured by mercury porosimetry, is 59 Å.

The ratio between volume V2, measured by mercury porosimetry, encompassed between $D_{mean}$−30 Å and $D_{mean}$+30 Å to the total mercury volume is 0.90.

Volume V3, measured by mercury porosimetry, encompassed in the pores with diameters of more than $D_{mean}$+30 Å is 0.035 ml/g.

Volume V6, measured by mercury porosimetry, encompassed in the pores with diameters of more than $D_{mean}$+15 Å is 0.04 ml/g.

The ratio between the adsorption surface area and the BET surface area is 0.75.

The pore volume, measured by mercury porosimetry, encompassed in the pores with diameters of more than 140 Å is 0.011 ml/g.

The pore volume, measured by mercury porosimetry, encompassed in the pores with diameters of more than 160 Å is 0.01 ml/g, The pore volume, measured by mercury porosimetry, encompassed in the pores with diameters of more than 200 Å is 0.009 ml/g.

The pore volume, measured by mercury porosimetry, encompassed in the pores with diameters of more than 500 Å is 0.001 ml/g.

The B/L ratio of the substrate is 0.13.

The packing density of the catalyst is 1.07 $g/cm^3$.

The X diffraction diagram contains the main lines that are characteristic of the gamma-alumina, and in particular it contains the peaks on one d encompassed between 1.39 and 1.40 Å and at one d encompassed between 1.97 Å and 2.00 Å.

The atomic sodium content is 300+/−5 20 ppm. The atomic sulfur content is 1500 ppm.

The NMR MAS spectra of the solid of $^{27}$Al of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 67%.

The catalyst contains two silico-aluminum zones, whereby said zones have Si/Al ratios that are less than or greater than the overall Si/Al ratio that is determined by X fluorescence. One of the zones has an Si/Al ratio that is determined by MET of 0.72, and the other zone has an Si/Al ratio that is determined by MET of 0.99.

EXAMPLE 3

Preparation and Shaping of a Silica-Alumina According to the Invention (SA3)

An alumina hydrate is prepared according to the teachings of U.S. Pat. No. 3,124,418. After filtration, the freshly prepared precipitate is mixed with a silicic acid solution that is prepared by decationizing resin exchange. The proportions of the two solutions are adjusted so as to achieve a composition of 70% Al$_2$O$_3$-30% SiO$_2$ in the final substrate. This mixture is quickly homogenized in a commercial colloidal mill in the presence of nitric acid such that the nitric acid content of the suspension at the outlet of the mill is 8% relative to the silica-alumina mixed solid. Then, the suspension is routinely dried in an atomizer in a conventional manner at 300° C. to 60° C. The thus prepared powder is shaped in a Z-arm in the presence of 8% nitric acid relative to the anhydrous product. The extrusion is carried out by passage of the paste through a die that is provided with orifices with a diameter of 1.4 mm. The extrudates that are thus obtained are dried at 150° C., then calcined at 550° C., then calcined at 750° C. in the presence of water vapor.

The characteristics of substrate SA3 are as follows:

The composition of the silica-alumina substrate is 69.5% Al$_2$O$_3$ and 30.5% SiO$_2$.

The BET surface area is 250 m$^2$/g.

The total pore volume, measured by nitrogen adsorption, is 0.45 ml/g.

The mean pore diameter, measured by mercury porosimetry, is 70 Å.

The ratio between volume V2, measured by mercury porosimetry, encompassed between $D_{mean}$−30 Å and $D_{mean}$+30 Å to the total mercury volume is 0.9.

Volume V3, measured by mercury porosimetry, encompassed in the pores with diameters of more than $D_{mean}$+30 Å is 0.021 ml/g.

Volume V6, measured by mercury porosimetry, encompassed in the pores with diameters of more than $D_{mean}$+15 Å is 0.035 ml/g.

The ratio between the adsorption surface area and the BET surface area is 0.82.

The pore volume, measured by mercury porosimetry, encompassed in the pores with diameters of more than 140 Å is 0.015 ml/g.

The pore volume, measured by mercury porosimetry, encompassed in the pores with diameters of more than 160 Å is 0.01 ml/g.

The pore volume, measured by mercury porosimetry, encompassed in the pores with diameters of more than 200 Å is 0.007 ml/g.

The pore volume, measured by mercury porosimetry, encompassed in the pores with diameters of more than 500 Å is 0.001 ml/g.

The X diffraction diagram contains the main lines that are characteristic of the gamma-alumina, and in particular it contains the peaks at one d encompassed between 1.39 and 1.40 Å and at one d encompassed between 1.97 Å and 2.00 Å.

The B/L ratio of the substrate is 0.11.

The packing density of the catalyst is 1.06 g/cm$^3$.

The atomic sodium content is 250+/−20 ppm. The atomic sulfur content is 2000 ppm.

The NMR MAS spectra of the solid of $^{27}$Al of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 69%.

The catalyst contains a single silico-aluminum zone with an Si/Al ratio that is determined by a MET microprobe of 0.37.

EXAMPLE 4

Preparation of a Silica-Alumina According to the Invention (SA4)

Substrate SA4 is prepared from substrate SA3, in the form of dried and calcined extrudates, by impregnation of TEOS (tetraethoxysilane) according to the method that is described by B. Beguin, E. Garbowski, and M. Primet in "Journal of Catalysis," page 595, Volume 127, 1991. Then, the impregnated extrudates are dried at 120° C. for 15 hours and calcined at 530° C. under a stream of dry air for 2 hours, then at 700° C. The thus obtained sample is named SA4.

The characteristics of the SA4 substrate are as follows:

The composition of the silica-alumina substrate is 67.5% Al$_2$O$_3$ and 33.5% SiO$_2$.

The BET surface area is 280 m$^2$/g.

The total pore volume, measured by nitrogen adsorption, is 0.43 ml/g.

The mean pore diameter, measured by mercury porosimetry, is 73 Å.

The ratio between volume V2, measured by mercury porosimetry, encompassed between $D_{mean}$−30 Å and $D_{mean}$+30 Å to the total mercury volume is 0.85.

Volume V3, measured by mercury porosimetry, encompassed in the pores with diameters of more than $D_{mean}$+30 Å is 0.019 ml/g.

Volume V6, measured by mercury porosimetry, encompassed in the pores with diameters of more than $D_{mean}$+15 Å is 0.032 ml/g.

The ratio between the adsorption surface area and the BET surface area is 0.8.

The pore volume, measured by mercury porosimetry, encompassed in the pores with diameters of more than 140 Å is 0.013 ml/g.

The pore volume, measured by mercury porosimetry, encompassed in the pores with diameters of more than 160 Å is 0.009 ml/g, The pore volume, measured by mercury porosimetry, encompassed in the pores with diameters of more than 200 Å is 0.006 ml/g.

The pore volume, measured by mercury porosimetry, encompassed in the pores with diameters of more than 500 Å is 0.001 ml/g.

The X diffraction diagram contains the main lines that are characteristic of the gamma-alumina, and in particular it contains the peaks at one d encompassed between 1.39 and 1.40 Å and at one d encompassed between 1.97 Å and 2.00 Å.

The atomic sodium content is 240+/−20 ppm. The atomic sulfur content is 1950 ppm.

The B/L ratio of the substrate is 0.12.

The packing density of the catalyst is 1.08 g/cm$^3$.

The NMR MAS spectra of the solid of $^{27}$Al of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 69%.

The catalyst contains a single silico-aluminum zone with an Si/Al ratio that is determined by a MET microprobe of 0.37.

EXAMPLE 5

Preparation and Shaping of a Silica-Alumina According to the Invention (SA5)

The aluminum hydroxide powder was prepared according to the process that is described in Patent WO 00/01617. The mean particle size of the aluminum hydroxide particles, measured by laser granulometry, is 40 microns. This powder is mixed with a silica soil that is prepared by decationizing resin exchange, then filtered on resin with a porosity of 2. The concentrations of silica soil and aluminum hydroxide powder are adjusted so as to obtain a final composition of 60% $Al_2O_3$ and 40% $SiO_2$. The shaping is carried out in the presence of 15% nitric acid relative to the anhydrous product. The mixing is done in a Z-arm mixing machine. The extrusion is carried out by passage of the paste through a die that is equipped with orifices with a 1.4 mm diameter. The extrudates that are thus obtained are dried at 150° C., then calcined at 550° C., then calcined at 750° C. in the presence of water vapor.

The characteristics of the substrate are as follows:

The composition of the silica-alumina substrate is 59.7% $Al_2O_3$ and 40.3% $SiO_2$.

The BET surface area is 248 m$^2$/g.

The total pore volume, measured by nitrogen adsorption, is 0.46 ml/g.

The mean pore diameter, measured by mercury porosimetry, is 69 Å.

The ratio between volume V2, measured by mercury porosimetry, encompassed between $D_{mean}$−30 Å and $D_{mean}$+30 Å to the total mercury volume is 0.9.

Volume V3, measured by mercury porosimetry, encompassed in the pores with diameters of more than $D_{mean}$+30 Å is 0.022 ml/g.

Volume V6, measured by mercury porosimetry, encompassed in the pores with diameters of more than $D_{mean}$+15 Å is 0.031 ml/g.

The ratio between the adsorption surface area and the BET surface area is 0.83.

The pore volume, measured by mercury porosimetry, encompassed in the pores with diameters of more than 140 Å is 0.012 ml/g.

The pore volume, measured by mercury porosimetry, encompassed in the pores with diameters of more than 160 Å is 0.0105 ml/g.

The pore volume, measured by mercury porosimetry, encompassed in the pores with diameters of more than 200 Å is 0.0065 ml/g.

The pore volume, measured by mercury porosimetry, encompassed in the pores with diameters of more than 500 Å is 0.001 ml/g.

The B/L ratio of the substrate is 0.12.

The packing density of the catalyst is 1.08 g/cm$^3$.

The X diffraction diagram contains the main lines that are characteristic of the gamma-alumina, and in particular it contains the peaks at one d encompassed between 1.39 and 1.40 Å and at one d encompassed between 1.97 Å and 2.00 Å.

The atomic sodium content is 200+/−20 ppm. The atomic sulfur content is 800 ppm.

The NMR MAS spectra of the solid of $^{27}$Al of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 70%.

The catalyst contains two silico-aluminum zones, whereby said zones have Si/Al ratios that are less than or greater than the overall Si/Al ratio that is determined by X fluorescence. One of the zones has an Si/Al ratio that is determined by MET of 0.22, and the other zone has an Si/Al ratio that is determined by MET of 0.85.

EXAMPLE 6

Preparation of a Silica-Alumina According to the Invention (SA6)

Substrate SA6 is prepared from substrate SA5, in the form of dried and calcined extrudates. After cooling, sample SA5 is brought into contact with an ethanolic solution of tetraethyl orthosilicate $Si(OC_2H_5)_4$. This bringing into contact is carried out at ambient temperature for 2 hours while being stirred. The solvent is then evaporated under reduced pressure. Then, the impregnated extrudates are dried at 120° C. for 15 hours and calcined at 530° C. under a stream of dry air for 2 hours, then calcined at 700° C. in the presence of water vapor.

The thus obtained sample is named SA6.

The thus obtained extrudates are dried at 150° C., calcined at 550° C.

The characteristics of the substrate are as follows:

The composition of the substrate in silica and alumina is 56.38% $Al_2O_3$ and 43.62% $SiO_2$.

The BET surface area is 280 $m^2/g$.

The total pore volume, measured by nitrogen adsorption, is 0.405 ml/g.

The mean pore diameter, measured by mercury porosimetry, is 60 Å.

The ratio between volume V2, measured by mercury porosimetry, encompassed between $D_{mean}-30$ Å and $D_{mean}+30$ Å to the total mercury volume is 0.9.

Volume V3, measured by mercury porosimetry, encompassed in the pores with diameters of more than $D_{mean}+30$ Å is 0.02 ml/g.

Volume V6, measured by mercury porosimetry, encompassed in the pores with diameters of more than $D_{mean}+15$ Å is 0.027 ml/g.

The ratio between the adsorption surface area and the BET surface area is 0.8.

The pore volume, measured by mercury porosimetry, encompassed in the pores with diameters of more than 140 Å is 0.011 ml/g.

The pore volume, measured by mercury porosimetry, encompassed in the pores with diameters of more than 160 Å is 0.01 ml/g.

The pore volume, measured by mercury porosimetry, encompassed in the pores with diameters of more than 200 Å is 0.006 ml/g.

The pore volume, measured by mercury porosimetry, encompassed in the pores with diameters of more than 500 Å is 0.001 ml/g.

The X diffraction diagram contains the main lines that are characteristic of the gamma-alumina, and in particular it contains the peaks at one d encompassed between 1.39 and 1.40 Å and at one d encompassed between 1.97 Å and 2.00 Å.

The B/L ratio of the substrate is 0.13.

The packing density of the catalyst is 1.09 $g/cm^3$.

The atomic sodium content is 200+/−20 ppm. The atomic sulfur content is 800 ppm.

The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 70%.

The catalyst contains two silico-aluminum zones, whereby said zones have Si/Al ratios that are less than or greater than the overall Si/Al ratio that is determined by X fluorescence. One of the zones has an Si/Al ratio that is determined by MET of 0.23, and the other zone has an Si/Al ratio that is determined by MET of 0.86.

EXAMPLE 7

Preparation and Shaping of a Silica-Alumina According to the Invention (SA7)

Substrate SA7 is obtained in the following manner.

The silica-alumina gels are prepared by mixing sodium silicate and water, and by sending this mixture to an ion exchange resin. An aluminum chloride hexahydrate solution in water is added to decationized silica soil. So as to obtain a gel, ammonia is added; the precipitate is then filtered, and washing is carried out with a concentrated water and ammonia solution until the conductivity of the washing water is constant. The gel that is obtained from this stage is mixed with the Pural boehmite powder so that the final composition of the mixed substrate of anhydrous product is, at this point of the synthesis, equal to 60% $Al_2O_3$-40% $SiO_2$. This suspension is passed into a colloidal mill in the presence of nitric acid. The content of nitric acid that is added is adjusted so that the percentage at the outlet of the nitric acid mill is 8% relative to the mixed solid oxide mass. This mixture is then filtered so as to reduce the amount of water in the mixed cake. Then, the cake is mixed in the presence of 10% nitric acid, then extruded. The mixing is done in a Z-arm mixing machine. The extrusion is carried out by passage of the paste through a die that is equipped with orifices with a diameter of 1.4 mm. The thus obtained extrudates are dried at 150° C., then calcined at 550° C., then calcined at 700° C. in the presence of water vapor.

The characteristics of the substrate SA7 are as follows:

The composition of the silica-alumina substrate is 60.7% $Al_2O_3$ and 39.3% $SiO_2$.

The BET surface area is 258 $m^2/g$.

The total pore volume, measured by nitrogen adsorption, is 0.47 ml/g.

The mean pore diameter, measured by mercury porosimetry, is 69 Å.

The ratio between volume V2, measured by mercury porosimetry, encompassed between $D_{mean}-30$ Å and $D_{mean}+30$ Å to the total mercury volume is 0.89.

Volume V3, measured by mercury porosimetry, encompassed in the pores with diameters of more than $D_{mean}+30$ Å is 0.032 ml/g.

Volume V6, measured by mercury porosimetry, encompassed in the pores with diameters of more than $D_{mean}+15$ Å is 0.041 ml/g.

The ratio between the adsorption surface area and the BET surface area is 0.83.

The pore volume, measured by mercury porosimetry, encompassed in the pores with diameters of more than 140 Å is 0.012 ml/g.

The pore volume, measured by mercury porosimetry, encompassed in the pores with diameters of more than 160 Å is 0.0082 ml/g.

The pore volume, measured by mercury porosimetry, encompassed in the pores with diameters of more than 200 Å is 0.0063 ml/g.

The pore volume, measured by mercury porosimetry, encompassed in the pores with diameters of more than 500 Å is 0.001 ml/g.

The B/L ratio of the substrate is 0.11.

The packing density of the catalyst is 1.06 $g/cm^3$.

The X diffraction diagram contains the main lines that are characteristic of the gamma-alumina, and in particular it contains the peaks at one d encompassed between 1.39 and 1.40 Å, and at one d encompassed between 1.97 Å and 2.00 Å.

The atomic sodium content is 200+/−20 ppm. The atomic sulfur content is 800 ppm.

The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 70%.

The catalyst contains a single silico-aluminum zone with an Si/Al ratio that is determined by a MET microprobe of 0.63.

EXAMPLE 8

Preparation of a Silica-Alumina According to the Invention (SA8)

Substrate SA8 is prepared from substrate SA7 in the form of dried and calcined extrudates. After cooling, sample SA7 is brought into contact with an ethanolic solution of tetra-ethyl orthosilicate $Si(OC_2H_5)_4$. This bringing into contact is carried out at ambient temperature for 2 hours while being stirred. The solvent is then evaporated under reduced pressure. Then, the impregnated extrudates are dried at 120° C. for 15 hours and calcined at 530° C. under a stream of dry air for 2 hours. The sample that is thus obtained is named SA8.

The characteristics of substrate SA8 are as follows:
The composition of the substrate in silica-alumina is 57.3% $Al_2O_3$ and 42.7% $SiO_2$.
The BET surface area is 278 m$^2$/g.
The total pore volume, measured by nitrogen adsorption, is 0.455 ml/g.
The mean pore diameter, measured by mercury porosimetry, is 64 Å.
The ratio between volume V2, measured by mercury porosimetry, encompassed between $D_{mean}$−30 Å and $D_{mean}$+30 Å to the total mercury volume is 0.87.
Volume V3, measured by mercury porosimetry, encompassed in the pores with diameters of more than $D_{mean}$+30 Å is 0.03 ml/g.
Volume V6, measured by mercury porosimetry, encompassed in the pores with diameters of more than $D_{mean}$+15 Å is 0.037 ml/g.
The ratio between the adsorption surface area and the BET surface area is 0.80.
A pore volume, measured by mercury porosimetry, encompassed in the pores with diameters of more than 140 Å is 0.011 ml/g.
The pore volume, measured by mercury porosimetry, encompassed in the pores with diameters of more than 160 Å is 0.007 ml/g.
The pore volume, measured by mercury porosimetry, encompassed in the pores with diameters of more than 200 Å is 0.005 ml/g.
The pore volume, measured by mercury porosimetry, encompassed in the pores with diameters of more than 500 Å is 0.001 ml/g.
The B/L ratio of the substrate is 0.12.
The packing density of the catalyst is 1.07 g/cm$^3$.
The X diffraction diagram contains the main lines that are characteristic of the gamma-alumina, and in particular it contains the peaks at one d encompassed between 1.39 and 1.40 Å and at one d encompassed between 1.97 Å and 2.00 Å.
The atomic sodium content is 200+/−20 ppm. The atomic sulfur content is 800 ppm.
The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 70%.

The catalyst contains a single silico-aluminum zone with an Si/Al ratio that is determined by a MET microprobe of 0.65.

EXAMPLE 9

Preparation of Hydrocracking Catalysts According to the Invention (C1 to C9)

Catalysts C1, C2, C3, C4, C5, C6, C7 and C8 are obtained by dry impregnation of an aqueous solution that contains tungsten and nickel salts, respectively, of substrates SA1, SA2, SA3, SA4, SA5, SA6, SA7 and SA8, in the form of extrudates and whose preparations were respectively described in Examples 1, 2, 3, 4, 5, 6, 7 and 8. The tungsten salt is ammonium metatungstate $(NH_4)_6H_2W_{12}O_{40}*4H_2O$ and that of nickel is nickel nitrate $Ni(NO_3)_2*6H_2O$. After maturation at ambient temperature in a water-saturated atmosphere, the impregnated extrudates are dried at 120° C. for one night and then calcined at 500° C. in dry air.

The final contents by weight of $WO_3$ and NiO of the catalysts are recorded in Table 1 below.

TABLE 1

Contents by Weight of $WO_3$ and NiO of Catalysts C1 to C8

|  | C1 | C2 | C3 | C4 | C5 | C6 | C7 | C8 |
|---|---|---|---|---|---|---|---|---|
| NiO (% by weight) | 3.6 | 3.3 | 3.5 | 3.4 | 3.5 | 3.5 | 3.4 | 3.2 |
| $WO_3$ (% by weight) | 24.7 | 24.8 | 24.3 | 24.6 | 24.5 | 24.9 | 24.3 | 24.4 |

Catalyst C9 is obtained by dry-impregnation of substrate SA5 (in the form of extrudates), prepared in Example 5 by a dry impregnation of a hexachloroplatinic acid solution $H_2PtCl_6$. The impregnated extrudates are then calcined at 550° C. in dry air. The platinum content is 0.48% by weight.

EXAMPLE 10

Evaluation of Catalysts C1 to C8 in Hydrocracking of a Vacuum Distillate in a High-Pressure Stage Catalysts C1 to C8, whose preparation is described in Example 9, are used to carry out the hydrocracking of a vacuum distillate whose primary characteristics are provided below:

| Type of Feedstock | Vacuum Distillate |
|---|---|
| Density at 15° C. | 0.9219 |
| % by weight of Sulfur | 2.52 |
| ppm by weight of Nitrogen | 880 |
| Simulated Distillation (SD) | |
| SD: 05% p° C. | 367 |
| SD: 10% p° C. | 380 |
| SD: 50% p° C. | 443 |
| SD: 90% p° C. | 520 |
| SD: End Point° C. | 690 |

Catalysts C1 to C8 were used according to the process of the invention by using a pilot unit that comprises one reactor with a flushed fixed bed, and the fluids circulate from bottom to top (up-flow).

Prior to the hydrocracking test, the catalysts are sulfurized at 120 bar, at 350° C. with a direct distillation gas oil supplemented with 2% by weight of DMDS.

After sulfurization, the catalytic tests were carried out under the following conditions:

| Total pressure | 14 MPa | T = 400° C. |
|---|---|---|

Volumetric flow rate (VVH) is equal to 0.7 h−1.

The catalytic performance levels are expressed by the net conversion into products that have a boiling point of less than 370° C., by the net selectivity of the middle distillate fraction, 150-370° C., and the ratio of gas oil yield/kerosene yield in the middle distillate fraction. They are expressed starting from the results of simulated distillation.

Net conversion CN is assumed to be equal to:

$$CN\ 370°\ C.=[(\%\ de\ 370°\ C._{effluent}^-)-(\%\ de\ 370°\ C._{feedstock}^-)]/[100-(\%\ de\ 370°\ C._{feedstock}^-)]$$

with

% of 370° C.$_{effluents}^-$=content by mass of compounds that have boiling points of less than 370° C. in the effluents, and % of 370° C.$_{feedstock}^-$=content by mass of compounds that have boiling points of less than 370° C. in the feedstock.

The coarse selectivity of middle distillate SB is assumed to be equal to:

$$SB\ definition=[(fraction\ of\ 150-370_{effluents})]/[(\%\ of\ 370°\ C._{effluents}^-)]$$

The gas oil yield/kerosene yield (go/ker. yield) in the middle distillate fraction is assumed to be equal to:

Go./ker. ratio=yield of the fraction (250° C.-370° C.) of the effluent/yield of the fraction (150° C.-250° C.) in the effluent.

The catalytic performance levels that are obtained are provided in Table 2 below.

TABLE 2

Catalytic Results of Single-Stage and High-Pressure Hydrocracking

| Catalyst | VVh (h⁻¹) | CN 370° C.⁻ % by weight | SB % by weight of middle distillate (DM) | Go./Ker. Ratio % by weight/% by weight |
|---|---|---|---|---|
| C1 | 0.7 | 70.6 | 73.9 | 1.25 |
| C2 | 0.7 | 71.2 | 73.7 | 1.28 |
| C3 | 0.7 | 70.4 | 73.9 | 1.26 |
| C4 | 0.7 | 71.8 | 73.3 | 1.23 |
| C5 | 0.7 | 71.3 | 73.5 | 1.22 |
| C6 | 0.7 | 71.5 | 73.4 | 1.22 |
| C7 | 0.7 | 71.1 | 73.0 | 1.20 |
| C8 | 0.7 | 72.5 | 73.2 | 1.23 |

EXAMPLE 11

Evaluation of Catalyst C9 under Conditions that Simulate the Operation of the Second Reactor of a So-Called Two-Stage Hydrocracking Process The feedstock of the second stage is produced by hydrotreatment of a vacuum distillate on a hydrorefining catalyst that is marketed by Axens in the presence of hydrogen at a temperature of 395° C. and at the hourly volumetric flow rate of 0.55 h−1. The conversion into 380° C. products is about 50% by weight. After a separation stage, the 380° C.+fraction is collected and will be used as a feedstock for the second stage. The physico-chemical characteristics of this feedstock are provided in Table 3:

TABLE 3

Characteristics of the Feedstock of the Second Stage

| Density (20/4) | 0.853 |
|---|---|
| Sulfur (ppm by weight) | 2.5 |
| Nitrogen (ppm by weight) | 1.4 |
| Simulated Distillation | |
| Starting Point | 322° C. |
| 5% Point | 364° C. |
| 10% Point | 383° C. |
| 50% Point | 448° C. |
| 90% Point | 525° C. |
| End Point | 589° C. |

This feedstock is injected into the $2^{nd}$-stage hydrocracking test unit that comprises a fixed-bed reactor with upward circulation of the feedstock ("up-flow"), into which is introduced catalyst C9 that is prepared in Example 9. Before the feedstock is injected, the catalyst is reduced under pure hydrogen to 450° C. for 2 hours.

The operating conditions of the test unit are as follows:

| Total pressure | 14 MPa |
|---|---|
| Catalyst | 50 ml |
| Temperature | 370° C. |
| Volumetric flow rate (vvh) h-1 | 1.1 |

The catalytic performance levels that are obtained under these conditions are described in Table 4 of this example.

TABLE 4

Characteristic Results

| Catalyst | VVh (h⁻¹) | CN 370° C.⁻ % by weight | SB % by weight of middle distillate (DM) | Go./Ker. ratio % by weight/% by weight |
|---|---|---|---|---|
| C9 | 1.1 | 78 | 72.0 | 1.1 |

Preceding Examples 10 and 11 therefore show every advantage to using a catalyst according to the invention to carry out the hydrocracking of hydrocarbon-containing feedstock. Actually, they make it possible to obtain high conversions of the feedstock and advantageous selectivities of middle distillates.

EXAMPLE 12

Evaluation of Catalysts C1 and C5 in the Hydrocracking of a Vacuum Distillate in a Stage at Moderate Pressure (Soft Hydrocracking)

Catalysts C1 and C5, whose preparation is described in Example 9, are used for carrying out the hydrocracking of vacuum distillate, described in Example 10.

Catalysts C1 and C5 have been used according to the process of the invention by using a pilot unit that comprises one reactor with a flushed fixed bed, and the fluids circulate from bottom to top (up-flow).

Prior to the hydrocracking test, the catalysts are sulfurized at 120 bar, at 350° C. with a direct distillation gas oil that is supplemented with 2% by weight of DMDS.

After sulfurization, the catalytic tests were carried out under the following conditions:

| | | |
|---|---|---|
| Total pressure | 5.5 MPa | T = 405° C. |
| Overall VVH | 0.8 h$^{-1}$ | |

The volumetric flow rate (VVH) is equal to 0.8 h−1.

The catalytic performance levels are expressed by the net conversion into products that have a boiling point of less than 370° C., by the net selectivity of the middle distillate fraction, 150-370° C., and the ratio of gas oil yield/kerosene yield in the middle distillate fraction. They are expressed starting from the results of simulated distillation, and the definitions are identical to those that are provided in Example 10.

The catalytic performance levels are provided in Table 5 below.

TABLE 5

Catalytic Results of Soft Hydrocracking at Moderate Pressure

| Catalyst | VVh (h$^{-1}$) | CN 370° C.$^-$ % by weight | SB % by weight of middle distillate (DM) |
|---|---|---|---|
| C1 | 0.8 | 48.4 | 81.2 |
| C5 | 0.8 | 48.9 | 80.9 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

The entire disclosure[s] of all applications, patents and publications, cited herein and of corresponding FRENCH application No. 0213640, filed 30 Oct. 2002, is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising:
   at least one hydro-dehydrogenating element which is an element of group VIB or of group VIII of the periodic table,
   a non-zeolitic silica-alumina-based substrate containing an amount of more than 10% by weight and less than or equal to 80% by weight of silica (SiO$_2$),
   a mean pore diameter, measured by mercury porosimetry, between 20 and 140 Å,
   a total pore volume, measured by mercury porosimetry, between 0.1 ml/g and 0.6 ml/g,
   a total pore volume, measured by nitrogen porosimetry, between 0.1 ml/g and 0.6 ml/g,
   a BET specific surface area between 150 and 500 m$^2$/g,
   a pore volume, measured by mercury porosimetry, in the pores with diameters of more than 140 Å, of less than 0.1 ml/g,
   a pore volume, measured by mercury porosimetry, in the pores with diameters of more than 160 Å, of less than 0.1 ml/g,
   a pore volume, measured by mercury porosimetry, in the pores with diameters of more than 200 Å, of less than 0.1 ml/g,
   a pore volume, measured by mercury porosimetry, in the pores with diameters of more than 500 Å, of less than 0.01 ml/g,
   a pore distribution such that the ratio between volume V2, measured by mercury porosimetry, between D$_{mean}$−30 Å and D$_{mean}$+30 Å to the total mercury volume is more than 0.6−volume V3, measured by mercury porosimetry, in the pores with diameters of more than D$_{mean}$+30 Å is less than 0.1 ml/g−volume V6, measured by mercury porosimetry, in the pores with diameters of more than D$_{mean}$+15 Å is less than 0.2 ml/g,
   an X ray diffraction diagram that contains at least the main lines that are characteristic of at least one of a transition alumina, which is an alpha, rho, chi, eta, gamma, kappa, theta or delta alumina.

2. A catalyst according to claim 1, having a proportion of octahedral Al$_{VI}$ determined by the analysis of the NMR MAS spectra of the solid of $^{27}$Al of more than 50%.

3. A catalyst according to claim 1 comprising nickel and tungsten.

4. A catalyst according to claim 1 comprising platinum and palladium.

5. A catalyst according to claim 1 further comprising at least one dopant which is phosphorus, boron, and/or silicon and which is deposited on the catalyst.

6. A catalyst according to claim 1 further comprising at least one element of group VIIB.

7. A catalyst according to claim 1 further comprising at least one element of group VB.

8. A catalyst according to claim 1 having a packing density of more than 0.85 g/cm$^3$.

9. A catalyst according to claim 1, wherein the pore volume, measured by mercury porosimetry, in the pores with diameters of more than 500 Å is 0.001 ml/g.

10. A process for hydrocracking and/or hydroconversion of a hydrocarbon-containing feedstock in the presence of a catalyst according to claim 1 comprising
   a mean pore diameter, measured by mercury porosimetry, between 20 and 140 Å,
   a total pore volume, measured by mercury porosimetry, between 0.1 ml/g and 0.6 ml/g,
   a total pore volume, measured by nitrogen porosimetry, between 0.1 ml/g and 0.6 ml/g,
   a BET specific surface area between 150 and 500 m$^2$/g,
   a pore volume, measured by mercury porosimetry, in the pores with diameters of more than 140 Å, of less than 0.1 ml/g,
   a pore volume, measured by mercury porosimetry, in the pores with diameters of more than 160 Å, of less than 0.1 ml/g,
   a pore volume, measured by mercury porosimetry, in the pores with diameters of more than 200 Å, of less than 0.1 ml/g, a pore volume, measured by mercury porosimetry, in the pores with diameters of more than 500 Å, of less than 0.01 ml/g, a pore distribution such that the ratio between volume V2, measured by mercury porosimetry, between $D_{mean}-30$ Å and $D_{mean}+30$ Å to the total mercury volume is more than 0.6–volume V3, measured by mercury porosimetry in the pores with diameters of more than $D_{mean}+30$ Å is less than 0 ml/g–volume V6, measured by mercury porosimetry, in the pores with diameters of more than $D_{mean}+15$ Å is less than 0.2 ml/g, an X ray diffraction diagram that contains at least the main lines that are characteristic of at least one of a transition alumina, which is an alpha, rho, chi, eta, gamma, kappa, theta or delta alumina.

11. A process for hydrocracking and/or hydroconversion according to claim 10 carried out in a single-stage process.

12. A process for hydrocracking and/or hydroconversion according to claim 11 comprising:
a first hydrorefining reaction zone in which the feedstock is brought into contact with at least one hydrorefining catalyst that exhibits in a standard activity test a methylcyclohexane conversion level that is less than 10% by mass,
a second hydrocracking reaction zone in which at least a portion of the effluent that is obtained from the hydrorefining stage is brought into contact with at least one non-zeolitic hydrocracking catalyst that exhibits in a standard activity test a methylcyclohexane conversion level that is more than 10/% by mass.

13. A process for hydrocracking and/or hydroconversion according to claim 10 comprising at least a first hydrorefining reaction zone and at least a second reaction zone that comprises a hydrocracking of at least a portion of the effluent of the first zone and that comprises an incomplete separation of ammonia from the effluent exiting from the first zone.

14. A process for hydrocracking and/or hydroconversion according to claim 10 carried out in a two-stage process.

15. A process according to claim 14, wherein the catalyst comprises at least one of the noble elements of group VIII.

16. A process according to claim 15, wherein the catalyst comprises platinum and/or palladium.

17. A process according to claim 10 carried out in the presence of hydrogen, at a temperature of more than 200° C., under a pressure of more than 1 MPa, wherein the volumetric flow rate is between 0.1 and 20 h$^{-1}$, and the amount of hydrogen that is introduced is such that the volumetric ratio of liter of hydrogen/liter of hydrocarbon is between 80 and 5000 l/l.

18. A process for hydrocracking and/or hydroconversion according to claim 10 carried out at a pressure between 20 and 60 bar and that results in conversions of less than 40%.

19. A process according to claim 10 carried out in a fixed bed.

20. A process according to claim 10 carried out in a boiling bed.

21. A process according to claim 10, wherein the hydrocracking catalyst is based on nickel and tungsten.

22. A process according to claim 10, wherein the hydrocarbon-containing feedstock is LCO (light cycle oil), an atmospheric distillate, or distillate, wherein the feedstock is obtained from a unit for extracting aromatic compounds from lubricating oil bases or obtained from a solvent dewaxing of lubricating oil base, wherein the distillate is obtained by a processes for desulfurization or hydroconversion in a fixed bed or in a boiling bed of a RAT (atmospheric residue) and/or RSV (vacuum residue) and/or a desasphalted oil, the deasphalted oil by itself or in a mixture.

23. A catalyst comprising:
at least one hydro-dehydrogenating element which is an element of group VIB or of group VIII of the periodic table,
a non-zeolitic silica-alumina-based substrate containing an amount of more than 10% by weight and less than or equal to 80% by weight of silica ($SiO_2$),
a mean nore diameter, measured by mercury porosimetry, between 20 and 140 Å,
a total nore volume, measured by mercury porosimetry, between 0.1 ml/g and 0.6 ml/g,
a total pore volume, measured by nitrogen porosimetry, between 0.1 ml/g and 0.6 ml/g,
a BET specific surface area between 150 and 500 m$^2$/g,
a pore volume, measured by mercury porosimetry, in the pores with diameters of more than 140 Å, of less than 0.1 ml/s,
a pore volume, measured by mercury porosimetry, in the pores with diameters of more than 160 Å, of less than 0.1 ml/g,
a pore volume, measured by mercury porosimetry, in the cores with diameters of more than 200 Å, of less than 0.1 ml/g,
a pore volume, measured by mercury porosimetry, in the pores with diameters of more than 500 Å is 0.01 ml/g,
a pore distribution such that the ratio between volume V2, measured by mercury porosimetry, between $D_{mean}-30$ Å and $D_{mean}+30$ Å to the total mercury volume is more than 0.6–volume V3, measured by mercury porosimetry, in the pores with diameters of more than $D_{mean}+30$ Å is less than 0.1 ml/g–volume V6, measured by mercury porosimetry, in the pores with diameters of more than $D_{mean}+15$ Å is less than 0.2 ml/g,
an X ray diffraction diagram that contains at least the main lines that are characteristic of at least one of a transition alumina, which is an alpha, rho, chi, eta, gamma, kappa, theta or delta alumina.

24. A process for hydrotreatment of a hydrocarbon-containing feedstock in the presence of a catalyst according to claim 1 comprising
a mean pore diameter, measured by mercury porosimetry, between 20 and 140 Å,
a total pore volume, measured by mercury porosimetry, between 0.1 ml/g and 0.6 ml/g,
a total pore volume, measured by nitwgen porosimetry, between 0.1 ml/g and 0.6 ml/g,
a BET specific surface area between 150 and 500 m$^2$/g,
a pore volume, measured by mercury porosimetry, in the pores with diameters of more than 140 Å, of less than 0.1 ml/g,
a pore volume, measured by mercury porosimetry, in the pores with diameters of more than 160 Å, of less than 0.1 ml/g,
a pore volume, measured by mercury porosimetry, in the pores with diameters of more than 200 Å, of less than 0.1 ml/g,
a pore volume, measured by mercury porosimetry, in the pores with diameters of more than 500 Å, of less than 0.01 ml/g,
a pore distribution such that the ratio between volume V2, measured by mercury porosimetry, between $D_{mean}-30$ Å and $D_{mean}+30$ Å to the total mercury volume is more than 0.6–volume V3, measured by mercury porosimetry in the pores with diameters of more than $D_{mean}+30$ Å is less than 0 ml/g–volume V6, measured by mercury porosimetry, in the pores with diameters of more than $D_{mean}+15$ Å is less than 0.2 ml/g, an X ray diffraction diagram that contains at least the main lines that are characteristic of at least one of a transition alumina, which is an alpha, rho, chi, eta, gamma, kappa, theta or delta alumina.

25. A process according to claim 24 carried out upstream from a hydrocracking process.

26. A process according to claim 25, wherein hydrocracking catalyst is based on zeolite.

27. A process according to claim 25, wherein hydrocracking catalyst is based on silica-alumina.

28. A non-zeolitic silica-alumina-based substrate containing more than 10% by weight and less than or equal to 80% by weight of silica ($SiO_2$), comprising
   a mean pore diameter, measured by mercury porosimetry, between 20 and 140 Å,
   a total pore volume, measured by mercury porosimetry, between 0.1 ml/g and 0.6 ml/g,
   a total pore volume, measured by nitrogen porosimetry, between 0.1 ml/g and 0.6 ml/g,
   a BET specific surface area between 150 and 500 $m^2/g$,
   a pore volume, measured by mercury porosimetry, in the pores with diameters of more than 140 Å, of less than 0.1 ml/g,
   a pore volume, measured by mercury porosimetry, in the pores with diameters of more than 160 Å, of less than 0.1 ml/g,
   a pore volume, measured by mercury porosimetry, in the pores with diameters of more than 200 Å, of less than 0.1 ml/g,
   a pore volume, measured by mercury porosimetry, in the pores with diameters of more than 500 Å, of less than 0.01 ml/g,
   a pore distribution such that the ratio between volume V2, measured by mercury porosimetry, between $D_{mean}-30$ Å and $D_{mean}+30$ Å to the total mercury volume is more than 0.6–volume V3, measured by mercury porosimetry, in the pores with diameters of more than $D_{mean}+30$ Å is less than 0.1 ml/g–volume V6, measured by mercury porosimetry, in the pores with diameters of more than $D_{mean}+15$ Å is less than 0.2 ml/g, an X ray diffraction diagram that contains at least the main lines that are characteristic of at least one of a transition alumina, which is an alpha, rho, chi, eta, gamma, kappa, theta or delta alumina.

29. A substrate according to claim 28, having a cationic impurity content of less than 0.1% by weight.

30. A substrate according to claim 28, having an anionic impurity content of less than 0.5% by weight.

31. A substrate according to claim 28, exhibiting an X ray diffraction diagram containing at least the main lines that are characteristic of at least one of a transition alumina, which is an eta, theta, delta or gamma alumina.

32. A substrate according to claim 28, exhibiting an X ray diffraction diagram containing at least the main lines that are characteristic of at least one of a transition alumina, which is an eta- or gamma-alumina.

33. A substrate according to claim 28, having a mean pore diameter encompassed between 40 and 120 Å.

34. A substrate according to claim 28 comprising at least two silico-aluminum zones having Si/Al ratios that are less than or greater than the overall Si/Al ratio, as determined by X fluorescence.

35. A substrate according to claim 28 comprising a single silico-aluminum zone having an Si/Al ratio that is equal to the overall Si/Al ratio, as determined by X fluorescence, and is less than 2.3.

36. A substrate according to claim 28, having a packing density, after calcination, of more than 0.65 $g/cm^3$.

37. A substrate according to claim 28 having an acidity that is measured by IR tracking of the thermodesorption of pyridine is such that the B/L ratio is between 0.05 and 1.

* * * * *

UNITED STATES PATENT AND TRADEMARK OFFICE
CERTIFICATE OF CORRECTION

PATENT NO. : 7,270,738 B2 Page 1 of 1
APPLICATION NO. : 10/696561
DATED : September 18, 2007
INVENTOR(S) : Patrick Euzen It is certified that error appears in the above-identified patent and that said Letters Patent is hereby corrected as shown below:

Column 41, line 30, reads "more than 10/%" should read -- more than 10% --
Column 41, line 50, reads "5000 I/l." should read -- 5000 l/l. --
Column 42, line 10, reads "a total nore" should read -- a total pore --
Column 42, line 12, reads "a total nore" should read -- a total pore --
Column 42, line 19, reads "0.1 ml/s," should read -- 0.1 ml/g, --
Column 42, line 24, reads "cores with" should read -- pores with --
Column 42, line 47, reads "nitwgen" should read -- nitrogen --

Signed and Sealed this

Twenty-ninth Day of April, 2008

JON W. DUDAS
*Director of the United States Patent and Trademark Office*